US011960238B2

(12) United States Patent
Tomita et al.

(10) Patent No.: US 11,960,238 B2
(45) Date of Patent: Apr. 16, 2024

(54) DRIVE TRANSMISSION DEVICE, DRIVE UNIT, AND IMAGE FORMING APPARATUS

(71) Applicants: Kenji Tomita, Tokyo (JP); Ryohhei Ohya, Kanagawa (JP)

(72) Inventors: Kenji Tomita, Tokyo (JP); Ryohhei Ohya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/096,569

(22) Filed: Jan. 13, 2023

(65) Prior Publication Data

US 2023/0236541 A1 Jul. 27, 2023

(30) Foreign Application Priority Data

Jan. 24, 2022 (JP) ................................. 2022-008823

(51) Int. Cl.
*G03G 21/18* (2006.01)
*G03G 21/16* (2006.01)

(52) U.S. Cl.
CPC ....... *G03G 21/186* (2013.01); *G03G 21/1647* (2013.01); *G03G 2221/1657* (2013.01)

(58) Field of Classification Search
CPC ............. G03G 21/186; G03G 21/1647; G03G 2221/1657; G03G 15/6552
See application file for complete search history.

(56) References Cited

U.S. PATENT DOCUMENTS

2010/0310281 A1 12/2010 Miura et al.
2011/0222920 A1 9/2011 Kobayashi et al.
2011/0266990 A1 11/2011 Murata et al.
2013/0101314 A1* 4/2013 Yasuda ................ G03G 15/757 399/167
2013/0223906 A1* 8/2013 Tomatsu .............. B65H 3/0684 399/361
2013/0237366 A1 9/2013 Yasuda et al.
2014/0312819 A1 10/2014 Murata et al.
2016/0349678 A1 12/2016 Maeda et al.
2016/0378049 A1 12/2016 Tomita et al.
2017/0343937 A1 11/2017 Tomita et al.
2017/0371291 A1 12/2017 Tomita et al.
2018/0181030 A1* 6/2018 Tanaka ............... G03G 15/2064
2018/0224779 A1 8/2018 Tomita et al.
2019/0018353 A1 1/2019 Tomita et al.

(Continued)

FOREIGN PATENT DOCUMENTS

CN 203072043 U 7/2013
CN 105437797 B 8/2018

(Continued)

OTHER PUBLICATIONS

Extended European Search Report dated May 31, 2023 in European Patent Application No. 23152115.4, 11 pages.

*Primary Examiner* — Francis C Gray
(74) *Attorney, Agent, or Firm* — XSENSUS LLP

(57) ABSTRACT

A drive transmission device includes a drive train including a plurality of drive transmitters, and a container. The plurality of drive transmitters of the drive train transmit a driving force of a drive source to a rotator rotatable around a shaft and a swing member rotatable around a shaft different from the shaft of the rotator. The container contains the drive train.

12 Claims, 20 Drawing Sheets

(56) References Cited

U.S. PATENT DOCUMENTS

| | | | | |
|---|---|---|---|---|
| 2019/0250540 | A1 | 8/2019 | Tomita | |
| 2020/0172359 | A1 | 6/2020 | Nanno et al. | |
| 2020/0174418 | A1* | 6/2020 | Ito ...................... | G03G 21/1619 |
| 2020/0326648 | A1 | 10/2020 | Maehata et al. | |
| 2021/0380359 | A1 | 12/2021 | Tomita | |

FOREIGN PATENT DOCUMENTS

| | | | |
|---|---|---|---|
| JP | H08-42644 | A | 2/1996 |
| JP | 2008-209624 | | 9/2008 |
| JP | 2017-052655 | | 3/2017 |
| JP | 2017-190223 | | 10/2017 |
| JP | 2017-197307 | | 11/2017 |
| JP | 6388412 | B2 | 9/2018 |
| JP | 2020-078890 | A | 5/2020 |

* cited by examiner

DRIVE TRANSMISSION DEVICE, DRIVE UNIT, AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-008823, filed on Jan. 24, 2022, in the Japan Patent Office, the entire disclosure of which is hereby incorporated by reference herein.

BACKGROUND

Technical Field

Embodiments of the present disclosure relate to a drive transmission device, a drive unit, and an image forming apparatus.

Background Art

Drive transmission devices in the related art are known to include a drive train including a plurality of drive transmitters to transmit a driving force of a drive source to a rotator and a swing member rotatable about, for example, a shaft.

A known drive transmission device has disclosed to have a drive train including a planetary gear mechanism. The drive transmission device transmits a driving force of a drive source via the planetary gear mechanism to a switching member as a swing member that switches the destination of conveyance of a sheet between a sheet ejection passage and a sheet reversal passage and an ejection roller as a rotator.

SUMMARY

Embodiments of the present disclosure described herein provide a novel drive transmission device including a drive train that includes a plurality of drive transmitters, and a container. The plurality of drive transmitters of the drive train transmit a driving force of a drive source to a rotator rotatable around a shaft and a swing member rotatable around a shaft different from the shaft of the rotator. The container contains the drive train.

Further, embodiments of the present disclosure described herein provide a drive unit including a swing member and a rotator. The swing member is rotatable around a shaft. The drive transmission device transmits a driving force of a drive source to the swing member and the rotator.

Further, embodiments of the present disclosure described herein provide an image forming apparatus including the above-described drive transmission device.

Further, embodiments of the present disclosure described herein provide an image forming apparatus including the above-described drive unit.

BRIEF DESCRIPTION OF THE SEVERAL VIEWS OF THE DRAWINGS

Exemplary embodiments of this disclosure will be described in detail based on the following figures, wherein.

Figure 1:
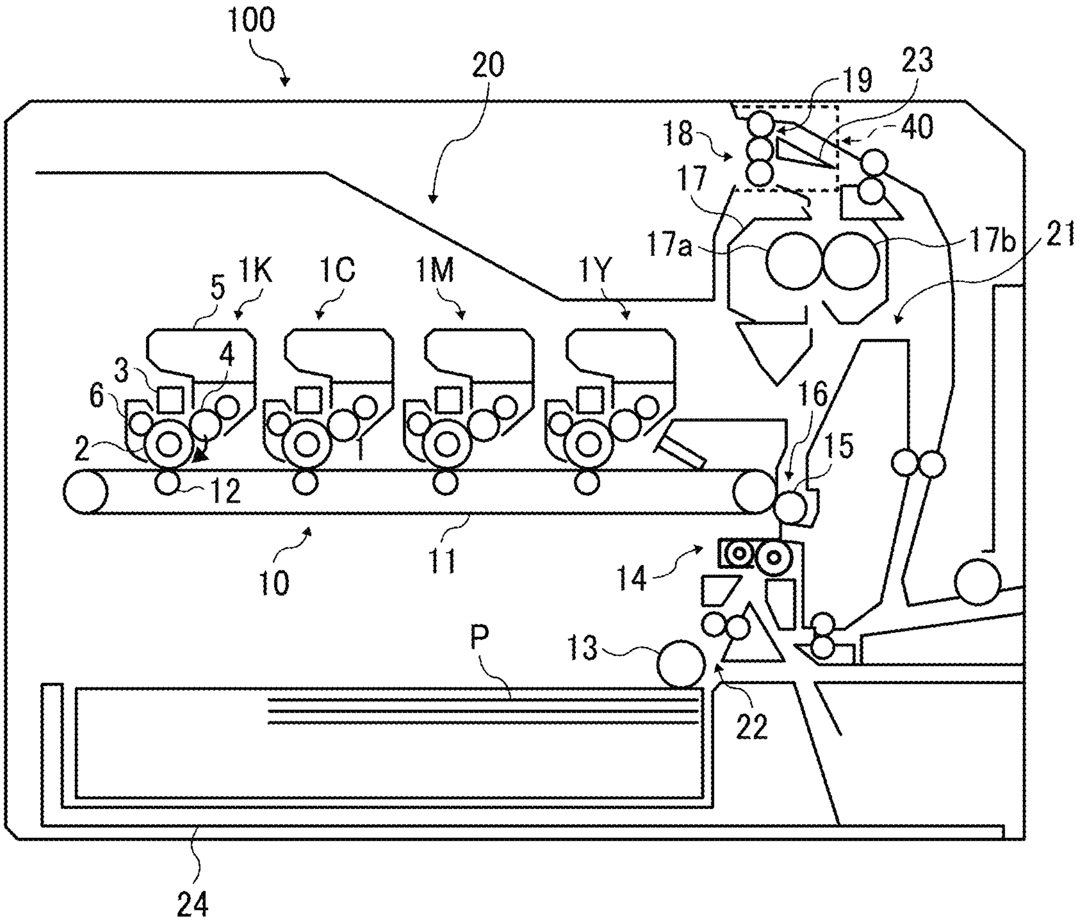
FIG. 1 is a schematic view of an image forming apparatus in its entirety, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to"

another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," w % ben used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, embodiments of the present disclosure are described with reference to the drawings.

FIG. 1 is a schematic view of an image forming apparatus in its entirety, according to an embodiment of the present disclosure.

In FIG. 1, a laser printer 100 serving as an image forming apparatus includes four image forming units 1Y, 1M, 1C, and 1K that form yellow (Y), magenta (M), cyan (C), and black (K) toner images, respectively. The laser printer 100 also includes an intermediate transfer device 10 serving as a primary transfer device, a secondary transfer device 16, and a fixing device 17. The intermediate transfer device 10 includes an intermediate transfer belt 11. The secondary transfer device 16 includes a secondary transfer roller 15 to transfer the toner image formed on the intermediate transfer belt 11, onto a sheet-shaped medium (recording medium) as a sheet. The fixing device 17 fixes the toner image transferred on the sheet. The laser printer 100 further includes a sheet ejection member 18, a sheet reverse member 19, and a switching claw 23. The sheet ejection member 18 ejects the sheet. The sheet reverse member 19 guides the sheet to a duplex sheet conveyance passage after the first face of the sheet is printed in a duplex printing. The switching claw 23 serving as a swing member and a switching member to switch the destination of conveyance of the sheet between the sheet ejection member 18 and the sheet reverse member 19. The laser printer 100 further includes a sheet tray 24, a sheet conveyance passage 22, and a duplex sheet conveyance passage 21. The sheet tray 24 contains the sheet P. The sheet P fed from the sheet tray 24 is conveyed through the sheet conveyance passage 22. The sheet P from the sheet reverse member 19 is conveyed through the duplex sheet conveyance passage 21 in the duplex printing.

The configurations of the four image forming units 1Y, 1M, 1C, and 1K are basically similar to each other, except that the image forming units 1Y, 1M, 1C and 1K include toners (developers) of different colors as image forming substances. Each of the image forming units 1Y, 1M, 1C and 1K is replaced at the end of its service life. A detailed description is now given of the image forming unit 1K as a representative of the four image forming units 1Y, 1C, 1M, and 1K. The image forming unit 1K includes a cylindrical photoconductor 2 serving as an image bearer, a charging device, and an exposure device 3. The charging device charges the surface of the photoconductor 2. The exposure device 3 exposes the charged surface of the photoconductor 2 with image information and forms an electrostatic latent image on the photoconductor 2. The image forming unit 1K further includes a developing device 4, a developer cartridge 5, and a cleaning device 6. The developing device 4 develops the electrostatic latent image on the photoconductor 2 with K toner and form a K toner image on the photoconductor 2. The developer cartridge 5 is disposed above the developing device 4 to store K toner. The cleaning device 6 cleans the surface of the photoconductor 2 after the toner image is transferred on the sheet.

The intermediate transfer device 10 includes the intermediate transfer belt 11 having an endless loop. The toner images of the multiple photoconductors 2 are transferred and overlaid on the intermediate transfer belt 11. The intermediate transfer device 10 further includes a primary transfer roller 12 disposed facing the photoconductor 2 via the intermediate transfer belt 11. The primary transfer roller 12 transfers the toner image formed on the surface of the photoconductor 2, onto the intermediate transfer belt 11.

The fixing device 17 includes a fixing roller 17*a* and a pressure roller 17*b*. The fixing roller 17*a* includes a heat source such as a halogen lamp. The pressure roller 17*b* is disposed in contact with the fixing roller 17*a* with a given pressure and rotates with the fixing roller 17*a* by friction. The fixing roller 17*a* and the pressure roller 17*b* contact with each other to form a fixing nip region.

A registration roller pair 14 is disposed upstream from the secondary transfer roller 15 in the conveyance direction in which the sheet P is conveyed. The conveyance direction of the sheet P may be referred to as a "sheet conveyance direction" in the following descriptions. The sheet P is conveyed in a direction so that the leading end of the sheet P extends perpendicular to the sheet conveyance direction of the sheet P. However, the sheet P is prone to be skewed when the sheet P is conveyed while the leading end of the sheet P is oblique and is not perpendicular to the sheet conveyance direction. In order to correct the skew of the sheet P, it is controlled that the leading end of the sheet P is brought to contact the registration roller pair 14 to make the sheet P slack temporarily and the sheet P is then conveyed to the secondary transfer device 16 at a given timing. Due to this slack and stiffness of the sheet P, the leading edge of the sheet P follows the nip region parallel to the rotation axis of the registration roller pair 14 to correct the skew of the sheet P, so that the toner image on the intermediate transfer belt 11 can be accurately aligned with the sheet P and transferred onto the sheet P.

When the laser printer 100 forms an image, the sheet P stacked in the sheet tray 24 is fed by a sheet feed roller 13 and is conveyed through the sheet conveyance passage 22. Then, the sheet P reaches the registration roller pair 14 whose rotation is stopped, so that the sheet P is made slack temporarily. Then, as the registration roller pair 14 starts rotating at the given timing to convey the sheet P in synchrony with movement of the toner image on the intermediate transfer belt 11, the sheet P is conveyed through the secondary transfer device 16, the fixing device 17, and the sheet ejection member 18 before the sheet P is ejected to the sheet ejection tray 20. Alternatively, the direction of conveyance of the sheet P is switched by the switching claw 23 so that the sheet P is conveyed to the sheet reverse member 19. Then, the sheet P is reversed by the sheet reverse member 19 and is conveyed through the duplex sheet conveyance passage 21 to the secondary transfer position again. After an image has been formed on the back face of the sheet P, the sheet P is conveyed to the sheet ejection member 18 to be ejected to the sheet ejection tray 20.

Figure 2:
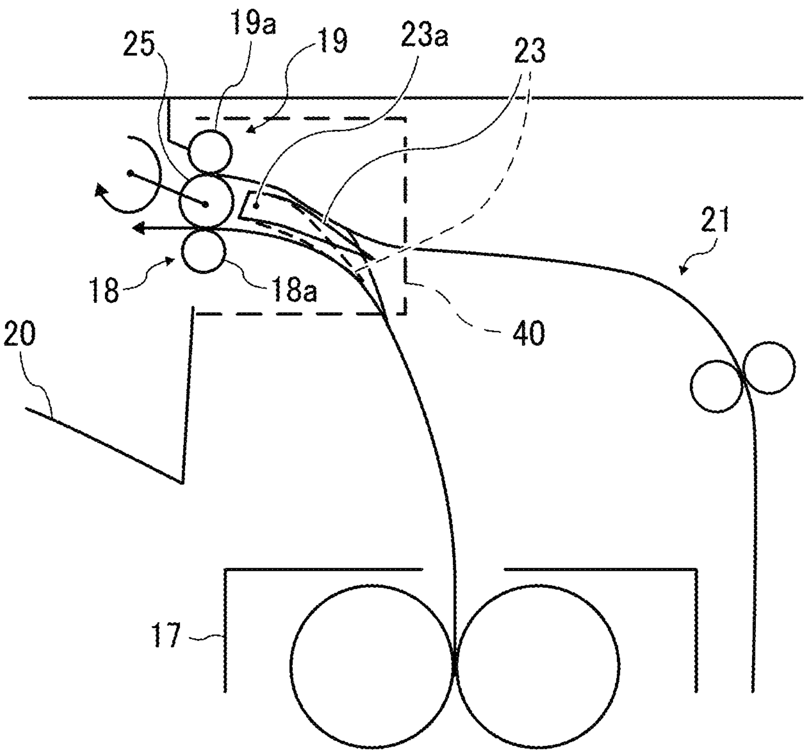
FIG. 2 is a schematic view of a switching claw and the components near the switching claw, according to an embodiment of the present disclosure.

FIG. 2 is a schematic view of the switching claw 23 and the components near the switching claw 23, according to an embodiment of the present disclosure.

The laser printer 100 according to the present embodiment includes a sheet ejection unit 40 serving as a drive unit provided with the sheet ejection member 18 and the sheet reverse member 19. The sheet ejection unit 40 includes a sheet ejection reverse drive roller 25 serving as a rotator, a sheet ejection driven roller 18*a*, and a sheet reverse driven roller 19*a*. The sheet ejection reverse drive roller 25 and the sheet ejection driven roller 18*a* serve as a sheet ejection roller pair of the sheet ejection member 18. The sheet ejection reverse drive roller 25 and the sheet reverse driven roller 19*a* serve as a reverse roller pair of the sheet reverse member 19.

In the present embodiment, the sheet ejection roller pair and the sheet reverse roller pair share the same drive roller.

The sheet ejection unit 40 includes the switching claw 23 serving as a swing member. The switching claw 23 is disposed adjacent to a position upstream from the sheet ejection reverse drive roller 25 in the sheet conveyance direction and is disposed between the sheet conveyance passage of the sheet reverse member 19 and the sheet conveyance passage of the sheet ejection member 18. A swing shaft 23*a* is disposed at the downstream end of the switching claw 23 in the sheet conveyance direction. The switching claw 23 is rotatably supported by the swing shaft 23*a* as a fulcrum. The switching claw 23 rotates so as to take a first position indicated by a solid line in FIG. 2 and a second position indicated by a broken line in FIG. 2.

When the sheet is ejected to the sheet ejection tray 20, the switching claw 23 is moved to the first position indicated by the solid line in FIG. 2 to cause the sheet ejection reverse drive roller 25 to rotate in the clockwise direction in FIG. 2. By so doing, the sheet P that has passed the fixing device 17 is guided to the sheet ejection member 18 by the switching claw 23 and is ejected to the sheet ejection tray 20 by the sheet ejection roller pair including the sheet ejection reverse drive roller 25 and the sheet ejection driven roller 18*a*.

Figure 3A:
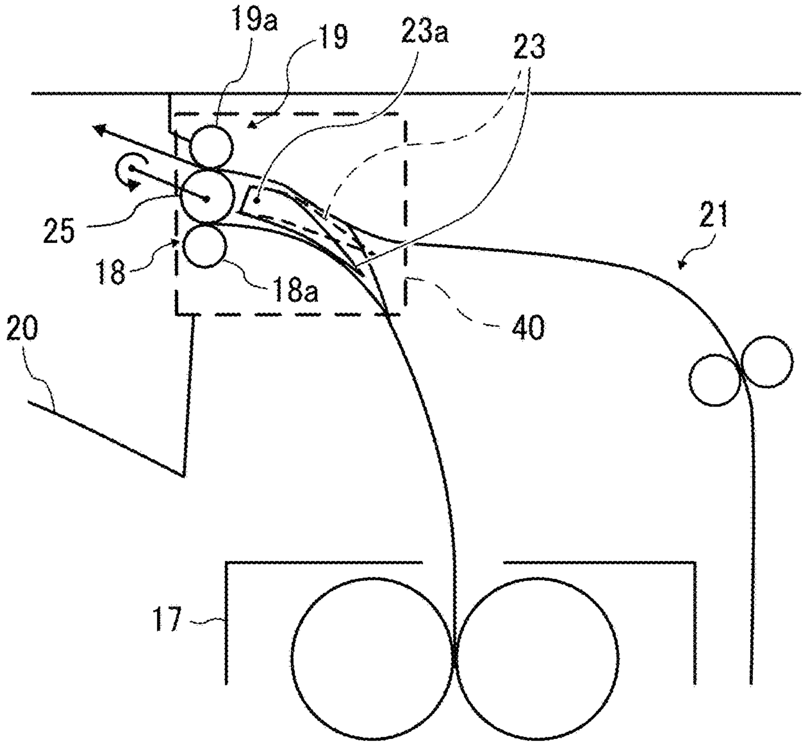
FIGS. 3A and 3B are diagrams each illustrating operations of the switching claw and a sheet ejection reverse drive roller when a sheet is conveyed to a duplex sheet conveyance passage, according to an embodiment of the present disclosure.
Figure 3B:
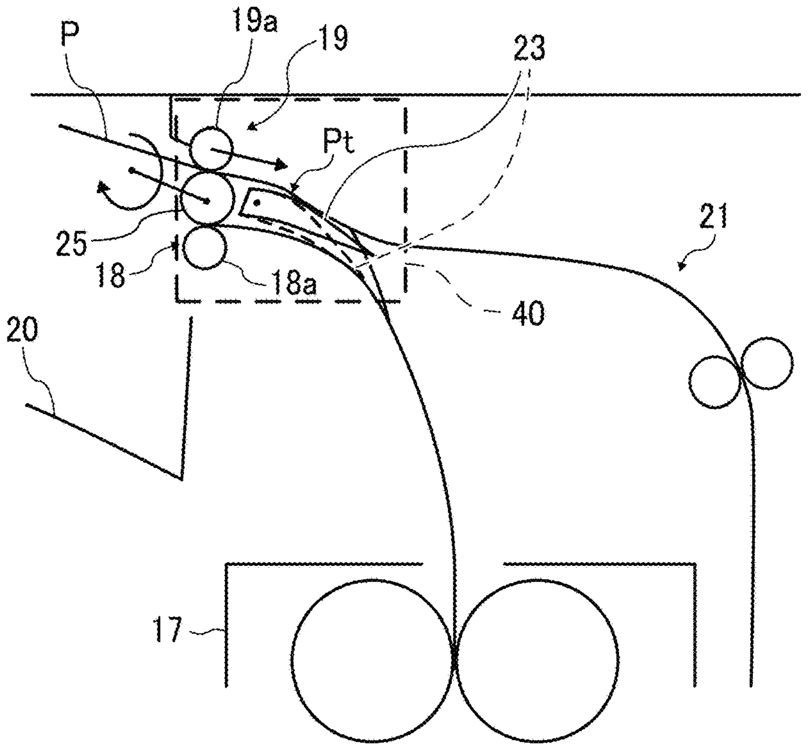

FIGS. 3A and 3B are diagrams each illustrating operations of the switching claw 23 and the sheet ejection reverse drive roller 25 when the sheet P is conveyed to the duplex sheet conveyance passage 21, according to an embodiment of the present disclosure.

As illustrated in FIG. 3A, as the image forming operation starts, the switching claw 23 is rotated from the first position indicated by the broken line in FIG. 3A to the second position indicated by the solid line in FIG. 3A. Further, the sheet ejection reverse drive roller 25 is rotated in the counterclockwise direction in FIG. 3A. By so doing, the sheet P that has passed the fixing device 17 is guided to the sheet reverse member 19 by the switching claw 23 and is conveyed by the sheet reverse roller pair including the sheet ejection reverse drive roller 25 and the sheet reverse driven roller 19*a*.

As illustrated in FIG. 3B, when the trailing end Pt of the sheet P passes the branching point of the sheet ejection member 18 and the sheet reverse member 19 and reaches the position illustrated in FIG. 3B, the sheet ejection reverse drive roller 25 is rotated in the clockwise direction in FIG. 3B to switch back the sheet P to convey the sheet P to the duplex sheet conveyance passage 21. Further, the switching claw 23 is rotated to move from the second position to the first position. By so doing, after the sheet P is conveyed to the duplex sheet conveyance passage 21 and an image is formed on the second face (the back face) of the sheet P, the sheet P is conveyed to the sheet ejection member 18 by the switching claw 23 and is then ejected to the sheet ejection tray 20 by the sheet ejection roller pair.

Figure 4A:
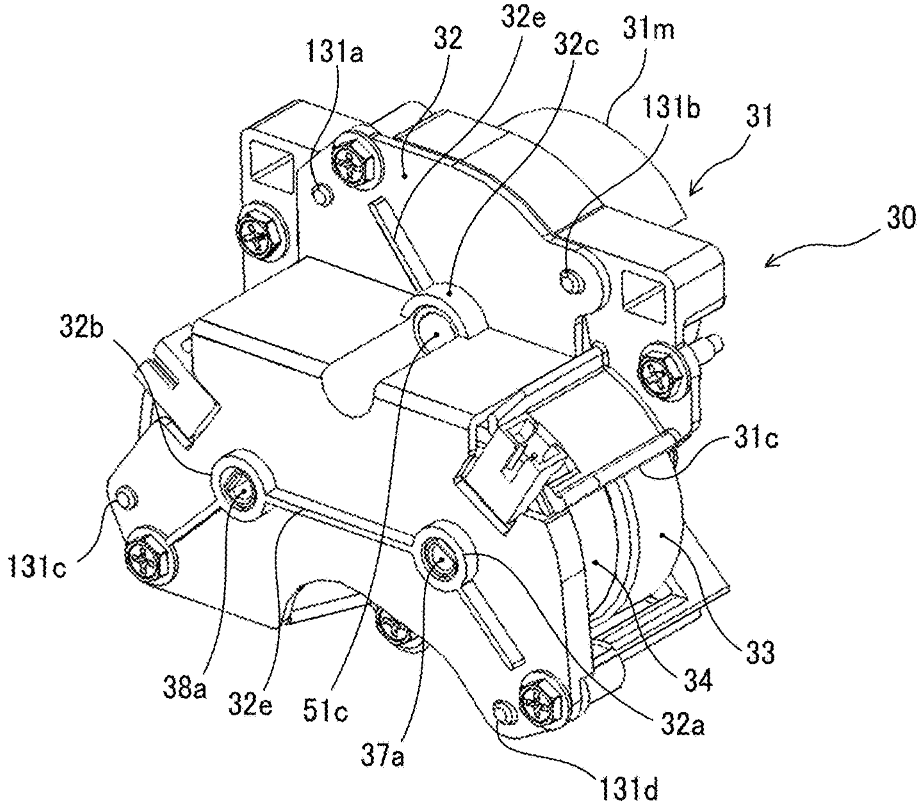
FIGS. 4A and 4B are perspective views of a drive transmission device according to an embodiment of the present disclosure.
Figure 4B:
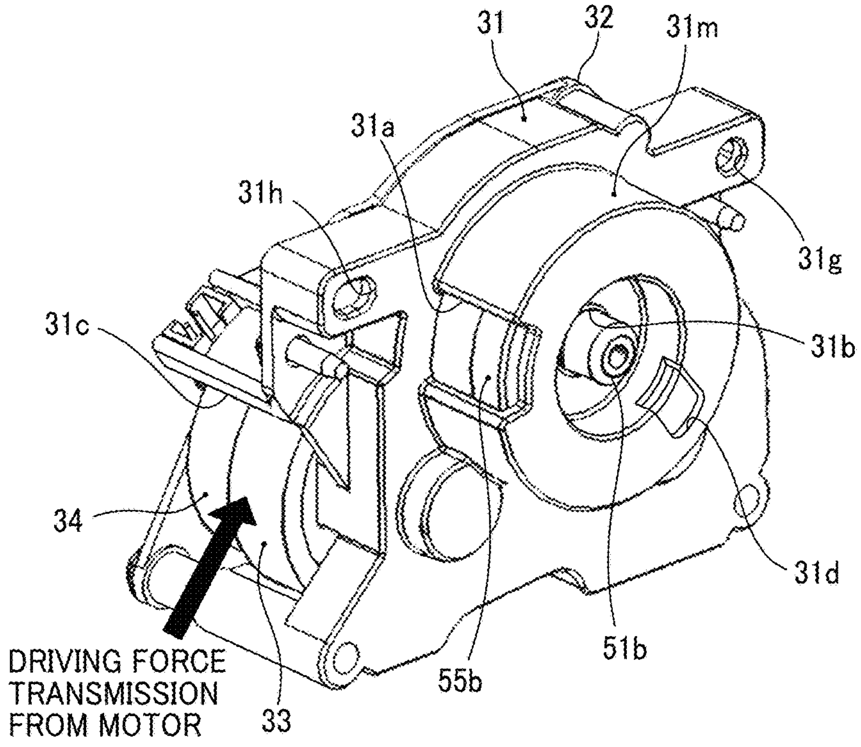

FIGS. 4A and 4B are perspective views of a drive transmission device 30 according to an embodiment of the present disclosure. The drive transmission device 30 transmits a driving force of a fixing motor serving as a drive source, to the sheet ejection reverse drive roller 25 and the switching claw 23 of the sheet ejection unit 40.

FIG. 4A is a perspective view of the drive transmission device 30 viewed from the side opposite to the sheet ejection unit 40 in the axial direction.

FIG. 4B is a perspective view of the drive transmission device 30 viewed from the sheet ejection unit 40 in the axial direction.

Figure 5:
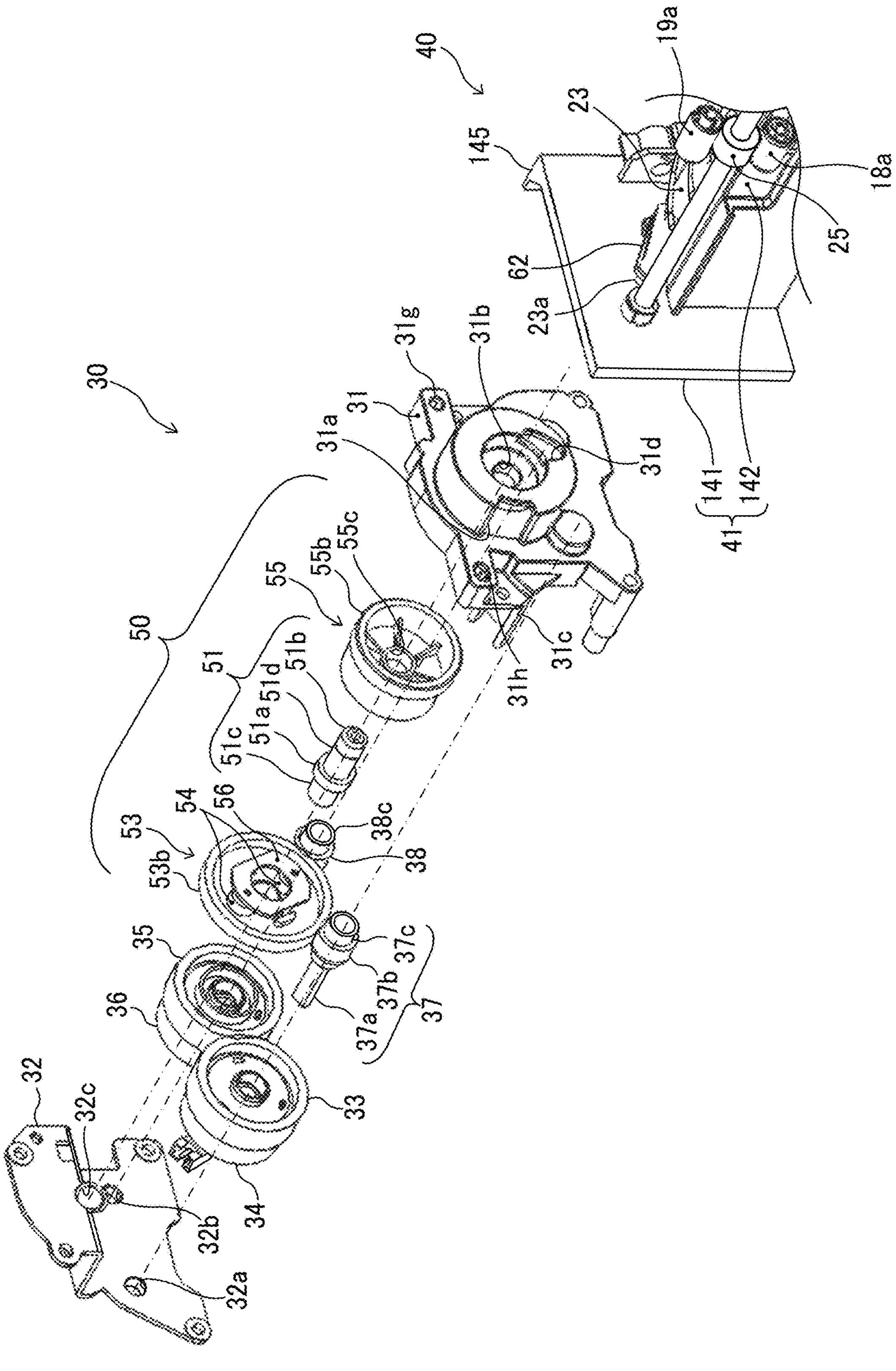
FIG. 5 is an exploded perspective view of the drive transmission device, viewed from a sheet ejection unit according to an embodiment of the present disclosure.

FIG. 5 is an exploded perspective view of the drive transmission device 30, viewed from the sheet ejection unit 40 according to an embodiment of the present disclosure.

Figure 6:
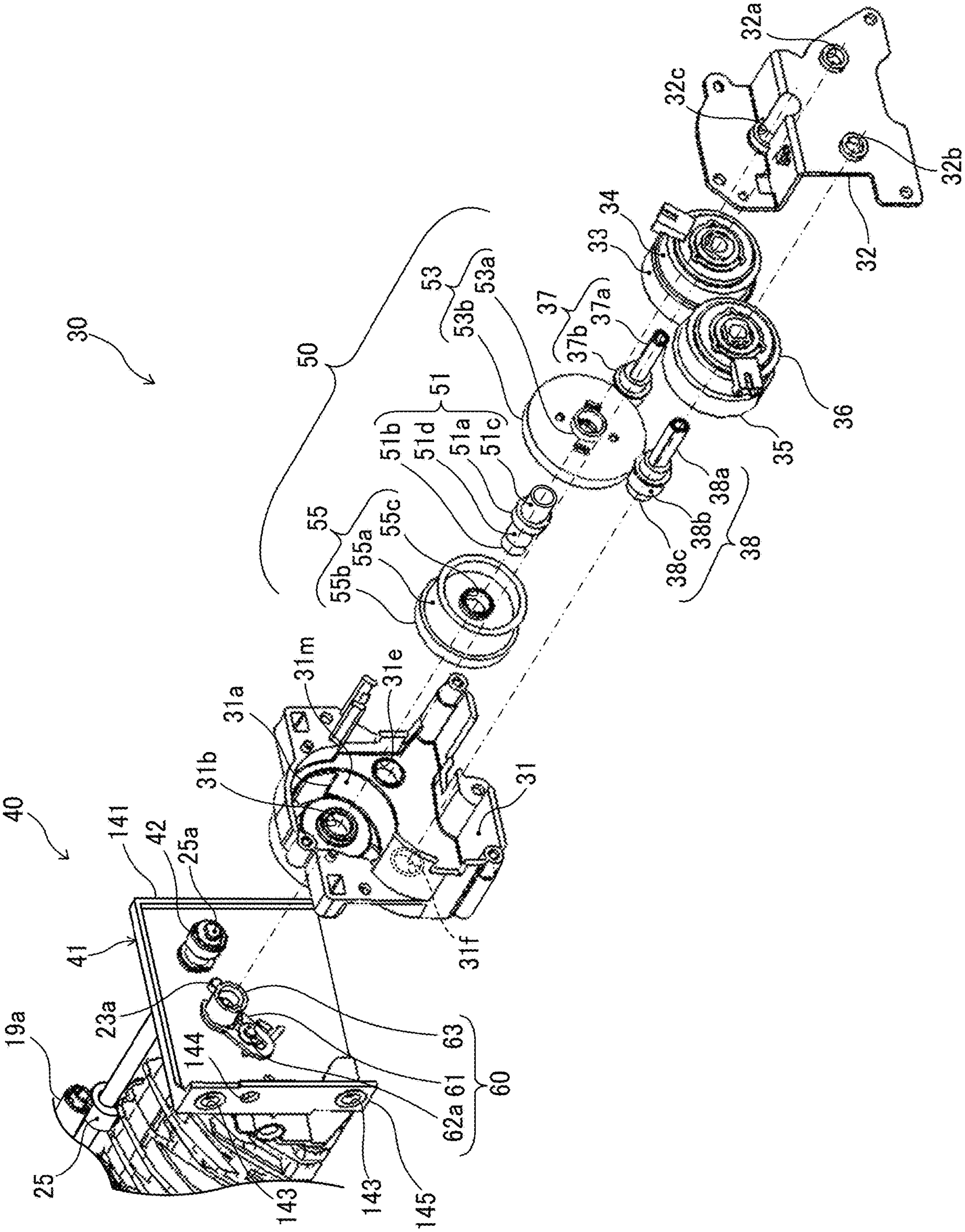
FIG. 6 is an exploded perspective view of the drive transmission device, viewed from another side opposite to the sheet ejection unit of FIG. 5.

FIG. 6 is an exploded perspective view of the drive transmission device 30, viewed from an opposite side to the sheet ejection unit 40 of FIG. 5.

Figure 7:
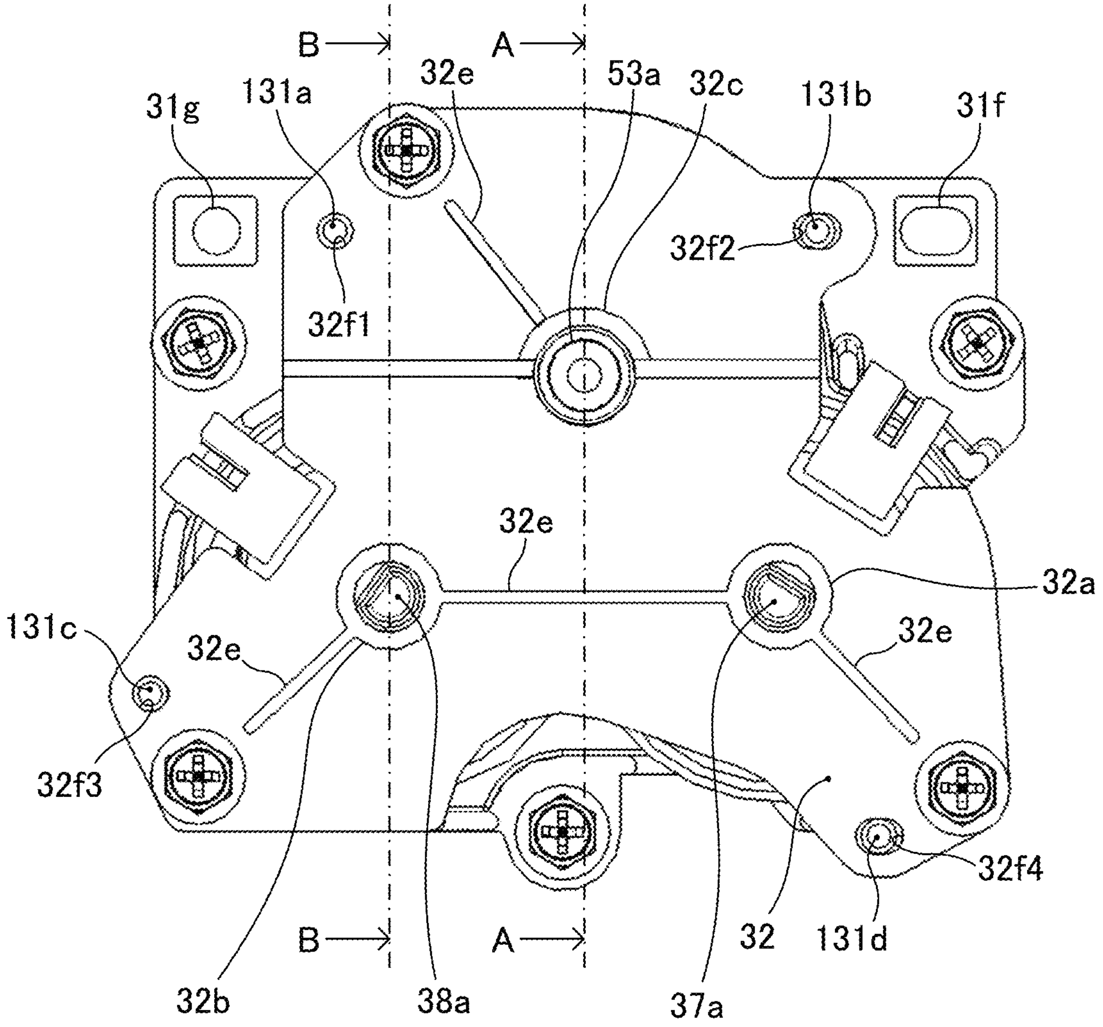
FIG. 7 is a front view of the drive transmission device of FIG. 5.

FIG. 7 is a front view of the drive transmission device 30 of FIG. 5.

Figure 8:
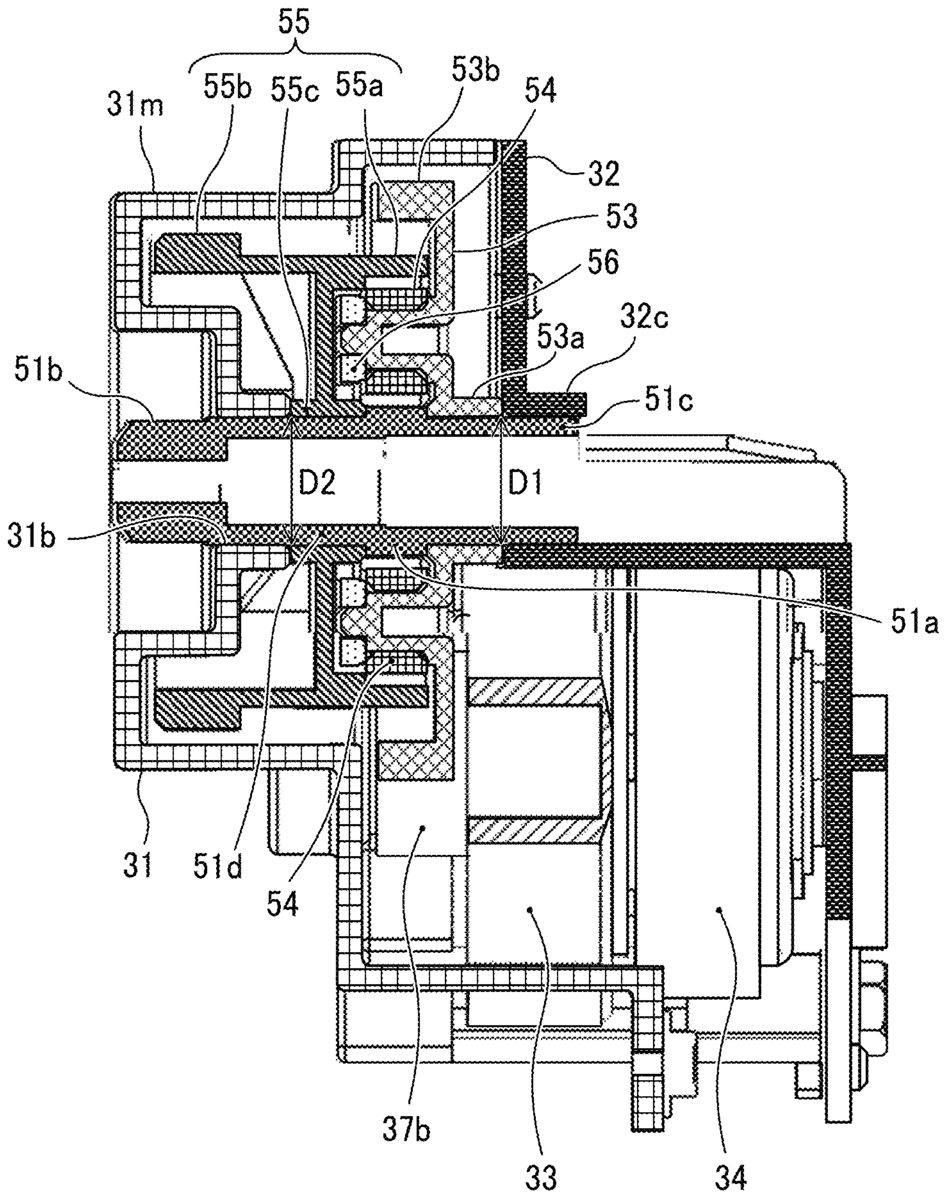
FIG. 8 is a cross sectional view of the drive transmission device of FIG. 7, along a line A-A of FIG. 7.

FIG. 8 is a cross sectional view of the drive transmission device 30 of FIG. 7, along a line A-A of FIG. 7.

Figure 9:
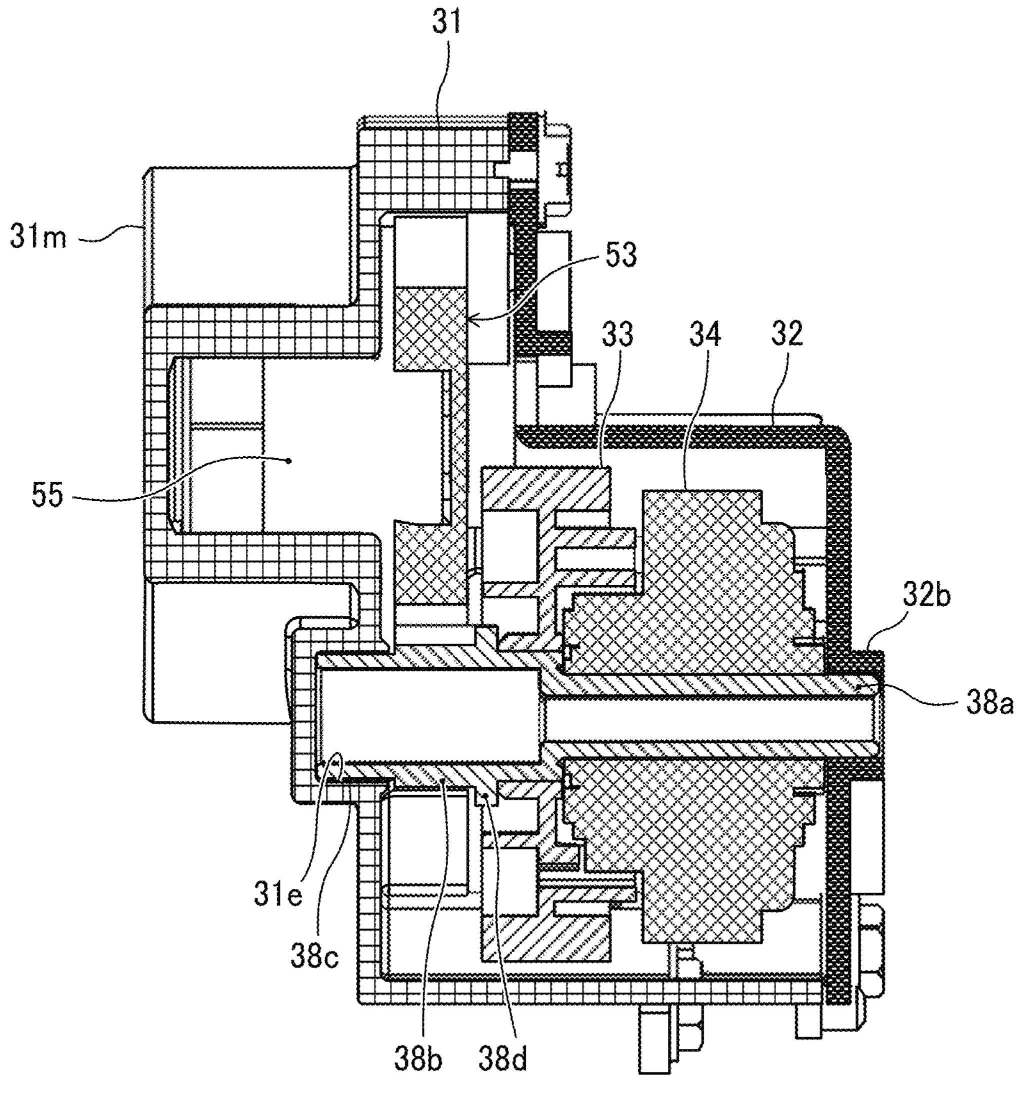
FIG. 9 is a cross sectional view of the drive transmission device of FIG. 7, along a line B-B of FIG. 7.

FIG. 9 is a cross sectional view of the drive transmission device 30 of FIG. 7, along a line B-B of FIG. 7.

The drive transmission device 30 includes an input gear 33, a reverse gear 35, a first drive shaft 37, a second drive shaft 38, and a planetary gear mechanism 50. The input gear 33 receives the driving force of the fixing motor that drives a roller of the fixing device 17. The reverse gear 35 is meshed with the input gear 33. The input gear 33 is attached to a shaft portion 37*a* of the first drive shaft 37 via the first electromagnetic clutch 34. The reverse gear 35 is attached to a shaft portion 38*a* of the second drive shaft 38 via a second electromagnetic clutch 36.

The first drive shaft 37 and the second drive shaft 38 have the configurations basically identical to each other. The first drive shaft 37 has the shaft portion 37*a*, a gear portion 37*b*, and a support portion 37*c*. The second drive shaft 38 has the shaft portion 38*a*, a gear portion 38*b*, and a support portion 38*c*. The distal end of the shaft portion 37*a* of the first drive shaft 37 is inserted into a first shaft support hole 32*a* of a cover 32 serving as a support, and the support portion 37*c* of the first drive shaft 37 is inserted into a first support recess 31*e* of the housing 31 serving as a container.

Like the first drive shaft 37, the distal end of the shaft portion 38*a* of the second drive shaft 38 is inserted into a second shaft support hole 32*b* of the cover 32, and the support portion 38*c* of the second drive shaft 38 is inserted into a second support recess 31*f* of the housing 31 (see FIG. 9). Due to such a configuration, the first drive shaft 37 and the second drive shaft 38 are rotatably supported at both ends by the cover 32 and the housing 31.

The carrier 53 that rotatably supports a planetary gear 54 of the planetary gear mechanism 50 is provided with an external gear portion 53*b*. The external gear portion 53*b* is meshed with the gear portion 37*b* of the first drive shaft 37 and the gear portion 38*b* of the second drive shaft 38. The carrier 53 is provided with a planetary cover 56 to prevent the planetary gear 54 from falling from the carrier 53.

The planetary gear mechanism 50 has a sun gear 51*a* included in a sun gear member 51. The sun gear member 51 includes the sun gear 51*a*, and a first joint 51*b* that is coupled to a second joint 63 of a swing mechanism 60. The swing mechanism 60 is included in the sheet ejection unit 40 that rotates the switching claw 23. The sun gear member 51 further includes an internal gear support portion 51*d* that rotatably supports an internal gear member 55 of the planetary gear mechanism 50, and a carrier support portion 51*c* that rotatably supports the carrier 53. The sun gear 51*a*, the first joint 51*b*, the carrier support portion 51*c*, and the internal gear support portion 51*d* are on the same axis.

The carrier 53 has a cylindrical support portion 53*a* protruding toward the cover 32 (see FIG. 6). The support portion 53*a* is rotatably supported by the carrier support portion 51*c* of the sun gear member 51 (see FIG. 8). The distal end of the carrier support portion 51*c* of the sun gear member 51 is inserted into a sun gear support hole 32*c* of the cover 32, so that the sun gear member 51 is rotatably supported by the sun gear support hole 32*c*. Further, the housing 31 includes a through hole 31*b* through which the first joint 51*b* is inserted. The internal gear support portion 51*d* of the sun gear member 51 is rotatably supported by the through hole 31*b* (see FIG. 8). As a result, the sun gear member 51 is rotatably supported at both ends by the cover 32 and the housing 31.

As illustrated in FIG. 8, the outer diameter D1 of the carrier support portion 51*c* is greater than the outer diameter D2 of the internal gear support portion 51*d*, which prevents the carrier support portion 51*c* from inserting into the through hole 31*b*. This configuration prevents reverse assembly of the sun gear member 51. In the present embodiment, the outer diameter D1 of the carrier support portion 51*c* is greater than the outer diameter D2 of the internal gear support portion 51*d*. However, the outer diameter D1 of the carrier support portion 51*c* may be smaller than the outer diameter D2 of the internal gear support portion 51*d*. The reverse assembly of the sun gear member 51 can also be prevented by this configuration.

The internal gear member 55 of the planetary gear mechanism 50 includes an internal gear portion 55*a*, an external gear portion 55*b*, and a support portion 55*c*. The internal gear portion 55*a* is meshed with the planetary gear 54. The external gear portion 55*b* is meshed with a sheet ejection gear 42 that is mounted on the rotary shaft 25*a* of the sheet ejection reverse drive roller 25. The cylindrical support portion 55*c* is rotatably supported by the internal gear support portion 51*d* of the sun gear member 51 (see FIG. 8).

The housing 31 holds parts constructing a drive train of the drive transmission device 30. The parts are, for example, the first drive shaft 37, the second drive shaft 38, the input gear 33, the reverse gear 35, the planetary gear mechanism 50, the first electromagnetic clutch 34, and the second electromagnetic clutch 36. By fixing the cover 32 to the housing 31 with screws, the drive transmission device 30 is integrated as a single unit, as illustrated in FIGS. 4A and 4B. As described above, by integrating the drive transmission device 30 as a single unit, the drive transmission device 30 can be assembled to the housing of the laser printer 100 by simply attaching the housing 31 to an apparatus rear side panel 100*b* (see FIGS. 19 and 21) of the laser printer 100, as described below. As a result, the assemblability of the drive train of the drive transmission device 30 including the first drive shaft 37, the second drive shaft 38, the input gear 33, the reverse gear 35, each part of the planetary gear mechanism 50, the first electromagnetic clutch 34, and the second electromagnetic clutch 36 can be significantly enhanced, when compared with the configuration in which such parts constructing a drive train are separately assembled to the housing of the laser printer 100. In particular, when the planetary gear mechanism 50 is included in the drive train like the present embodiment, the number of parts of the drive train increases. For this reason, the integrated drive transmission device can enhance the assemblability of the drive train effectively.

The housing 31 has an input opening 31*c* to mesh the input gear 33 with the gear portion close to the fixing motor. The housing 31 includes an internal gear container 31*m* that contains the internal gear member 55. The internal gear container 31*m* is provided with an output opening 31*a* to mesh the external gear portion 55*b* of the internal gear member 55 with the sheet ejection gear 42 (see FIG. 6). The internal gear container 31*m* has an escape hole 31*d* that allows a link shaft 62*a* of a second link member 62 (see FIG. 13) of the swing mechanism 60 to escape. As illustrated in FIG. 4B, the first joint 51*b* of the sun gear member 51 passes through the through hole 31*b*.

A primary reference positioning hole 31*g* and a secondary reference positioning hole 31*h* are provided on the upper part of the housing 31. The primary reference positioning hole 31*g* is a round hole to position the housing 31 to the side panel of the housing of the laser printer 100. The secondary reference positioning hole 31*h* is a slot.

The sheet ejection unit 40 includes a sheet ejection frame 41 serving as a support frame. The sheet ejection frame 41 includes frame side panels 141 serving as a pair of frame supports, and a sheet ejection guide 142 (see FIG. 5) disposed to bridge the frame side panels 141. Each of the frame side panels 141 has a fixing portion 145 to be fixed to the apparatus side panel of the housing of the laser printer 100. The apparatus side panel of the housing of the laser printer 100 is bent at substantially 90 degrees outwardly in the axial direction of the sheet ejection unit 40. One of screw through holes 143 is formed in the upper end of the fixing portion 145 and another one of the screw through holes 143 is formed in the lower end of the fixing portion 145. The screw through holes 143 are formed through which screws are inserted. A positioning hole 144 is provided between these screw through holes 143.

Figure 10:
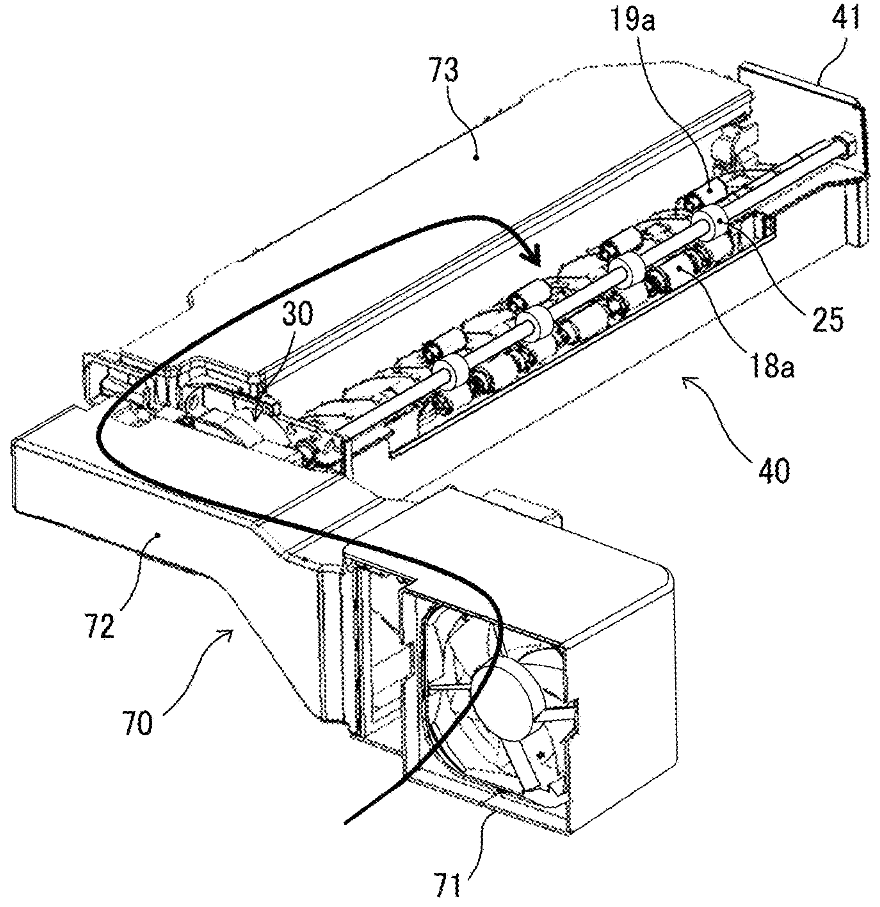
FIG. 10 is a perspective view of a cooling device, the drive transmission device, and the sheet ejection unit, according to an embodiment of the present disclosure.

FIG. 10 is a perspective view of a cooling device 70, the drive transmission device 30, and the sheet ejection unit 40, according to an embodiment of the present disclosure.

As illustrated in FIGS. 4A and 7, the cover 32 has ribs 32*e* to reinforce the cover 32. However, in the present embodiment, as illustrated in FIG. 10, a first duct 72 of the cooling device 70 is disposed outside the axial direction of the drive transmission device 30. The cooling device 70 cools the sheet ejection guide 142 to guide the sheet that has passed through the fixing device 17. Due to such a configuration, the drive transmission device 30 on the side near the cover 32 does not have a sufficient space to place the ribs 32*e* higher. Due to the ribs 32*e*, the rigidity of the cover 32 is not obtained sufficiently. For this reason, when the cover 32 is fixed to the housing 31 with screws, the cover 32 is prone to deform.

As described above, the cover 32 supports one end of each of the first drive shaft 37, the second drive shaft 38, and the sun gear member 51. For this reason, if the cover 32 is deformed, the sun gear member 51, the first drive shaft 37, and the second drive shaft 38 are inclined. As a result, rotations of the sun gear member 51, the first drive shaft 37, and the second drive shaft 38 may be less accurate and noise may occur.

As illustrated in FIGS. 4A and 7 in the present embodiment, the housing 31 has four positioning projections 131*a*, 131*b*, 131*c*, and 131*d* to position four corners of the cover 32. The cover 32 has four positioning holes 32*f*1, 32*f*2, 3203, and 32*f*4 at four corners so that the positioning projections 131*a*, 131*b*, 131*c*, and 131*d* of the housing 31 pass through, respectively. Each of the positioning holes 32*f*1 and 32*f*3 has a diameter substantially same as the outer diameter of each positioning projection and serve as a primary reference for the positioning. On the other hand, each of the positioning holes 32*f*2 and 32*f*4 has a slot and serves as a secondary reference for the positioning.

By positioning the cover 32 at the four corners as described above, the cover 32 is fastened to the housing 31 with screws while reducing deformation of the cover 32 at these four positioning locations. As a result, deformation of the cover 32 is prevented at the fastening of the cover 32 to the housing 31 with screws.

The cooling device 70 illustrated in FIG. 10 includes a cooling fan 71, the first duct 72, and a second duct 73 disposed on the upper part of the sheet ejection unit 40. As indicated by arrow in FIG. 10, air is taken in by the cooling fan 71, is flown from the first duct 72 to the second duct 73, is blown out from the blowout port of the second duct 73, and cools the sheet passing through the fixing device 17 and the sheet ejection guide 142. By cooling the sheet ejection guide 142, dew condensation on the sheet ejection guide 142 under the environment in a low temperature can be prevented.

Figure 11:
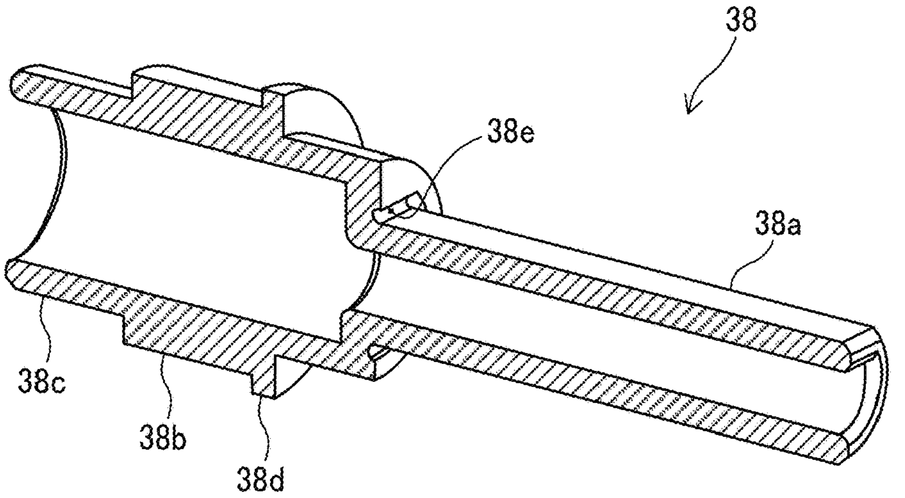
FIG. 11 is a perspective, cross-sectional view of a second drive shaft, according to an embodiment of the present disclosure.

FIG. 11 is a perspective, cross-sectional view of the second drive shaft 38.

As illustrated in FIG. 11, a flange 38*d* is formed at an end of the gear portion 38*b* near the shaft portion 38*a*. Grease is applied to a tooth surface of the gear portion 38*b*, and when the grease enters between the armature and the rotor of the second electromagnetic clutch 36 attached to the shaft portion 38*a*, it is likely that a connection failure or an idling failure of the second electromagnetic clutch 36 occurs. To prevent this inconvenience, the flange 38*d* is provided at the end of the gear portion 38*b* on the side of the shaft portion 38*a* to prevent grease applied to the gear portion 38*b* from moving to the second electromagnetic clutch 36 supported by the shaft portion 38*a*.

Further, the shaft portion 38*a* has a smaller diameter than any different portions of the second drive shaft 38 and is formed in a D-cut shape. A groove portion 38*e* is formed in a step face orthogonal to the axial direction at a step between the end of the shaft portion 38*a* on the side of the sheet ejection unit and the different portion of the second drive shaft 38 to weaken the rigidity. Since the second drive shaft 38 is made of resin and the groove portion 38*e* is formed to weaken the rigidity, the step face can be elastically deformed easily. As a result, an impact at the time of engagement of the second electromagnetic clutch is absorbed by elastic deformation of the step face, and damage on the second drive shaft 38 is prevented.

The first drive shaft 37 has the above-described condition that is substantially the same as the configuration of the second drive shaft 38.

Figure 12:
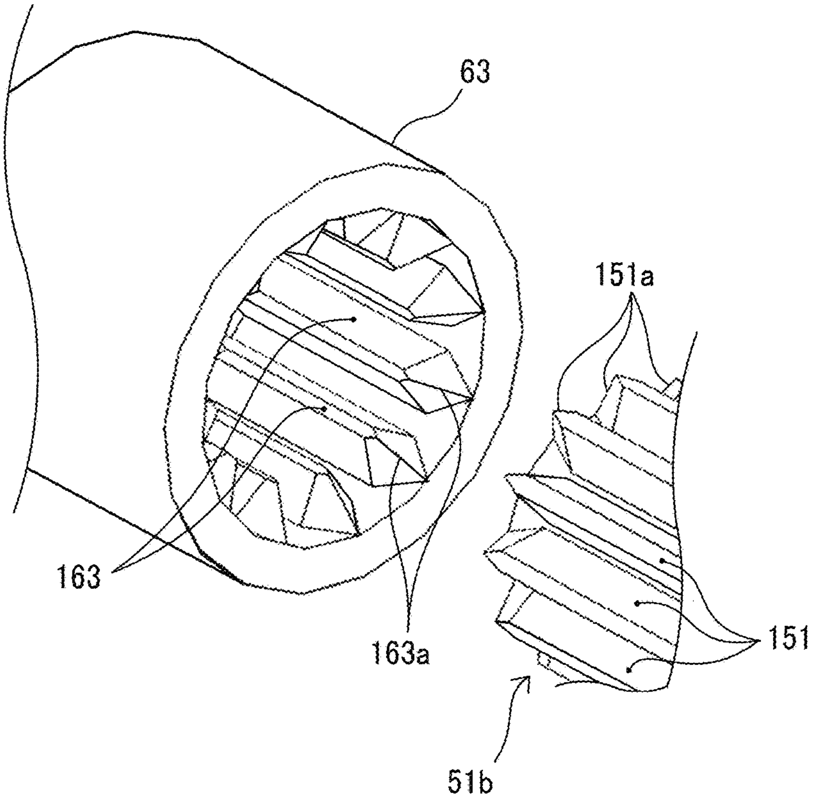
FIG. 12 is a perspective view of a first joint and a second joint, according to an embodiment of the present disclosure.

FIG. 12 is a perspective view of the first joint 51*b* and the second joint 63.

As illustrated in FIG. 12, the first joint 51*b* serving as the coupler is a spline shaft having an external gear 151 serving as a drive transmitting portion on the shaft portion. The second joint 63 serving as the coupled member is a spline hole having an internal gear 163 serving as a driven member on the inner circumferential surface. When the first joint 51*b* is inserted into the second joint 63, the first joint 51*b* is drivingly coupled to the second joint 63.

If the play in the rotational direction is relatively large when the first joint 51*b* is inserted into the second joint 63, the start of the driving of the switching claw 23 is delayed, the switching of the conveyance destination is not performed in time, and the sheet is unlikely to be conveyed to a desired conveyance destination. To prevent this inconvenience, the clearance between the internal gear 163 of the second joint 63 and the external gear 151 of the first joint 51*b* is set to be relatively small. However, when the clearance is relatively small, the external gear 151 of the first joint 51*b* are likely to come into contact with the internal gear 163 of the second joint 63, which makes it difficult to insert the first joint 51*b* into the second joint 63.

To prevent this inconvenience, in the present embodiment, the axial ends of the external gear 151 of the first joint 51*b* to the second joint 63 are tapered toward the axial ends, and the teeth face ends to the second joint 63 are inclined faces 151*a* inclined toward the rotational direction of the first joint 51*b*. Similarly, the axial ends of the internal gear 163 of the second joint 63 to the first joint 51*b* are also tapered toward the axial ends, and the teeth face ends to the first joint 51*b* are inclined faces 163*a* inclined toward the rotational direction of the second joint 63. With these configurations, the external gear 151 of the first joint 51*b* can be guided between the internal gear 163 of the second joint 63 by the inclined faces 151*a* and 163*a*. Due to such a configuration, as the first joint 51*b* is inserted into the second joint 63 while the external gear 151 of the first joint 51*b* are in contact with the internal gear 163 of the second joint 63, the external gear 151 of the first joint 51*b* are guided by the inclined faces 151*a* and 163*a*. Then, each tooth of the external gear 151 of the first joint 51*b* enter between the adjacent teeth of the internal gear 163 of the second joint 63. As a result, the first joint 51*b* can be easily inserted into the second joint 63, and the first joint 51*b* can be easily drivingly coupled to the second joint 63.

In the present embodiment, the first joint 51*b* is a spline shaft and the second joint 63 is a spline hole. However, the second joint 63 may be a spline shaft and the first joint 51*b* may be a spline hole. In the above description, the inclined face is provided on both the external gear 151 of the first joint 51*b* and the internal gear 163 of the second joint 63. However, the inclined face may be provided on only one of the external gear 151 of the first joint and the internal gear

163 of the second joint. In the above description, the spline joint including the spline shaft and the spline hole is used. However, the joint is not limited to the spline joint.

A description is given of a swing mechanism 60 that rotates the switching claw 23, with reference to FIGS. 6, 13, 14A, and 14B.

Figure 13:
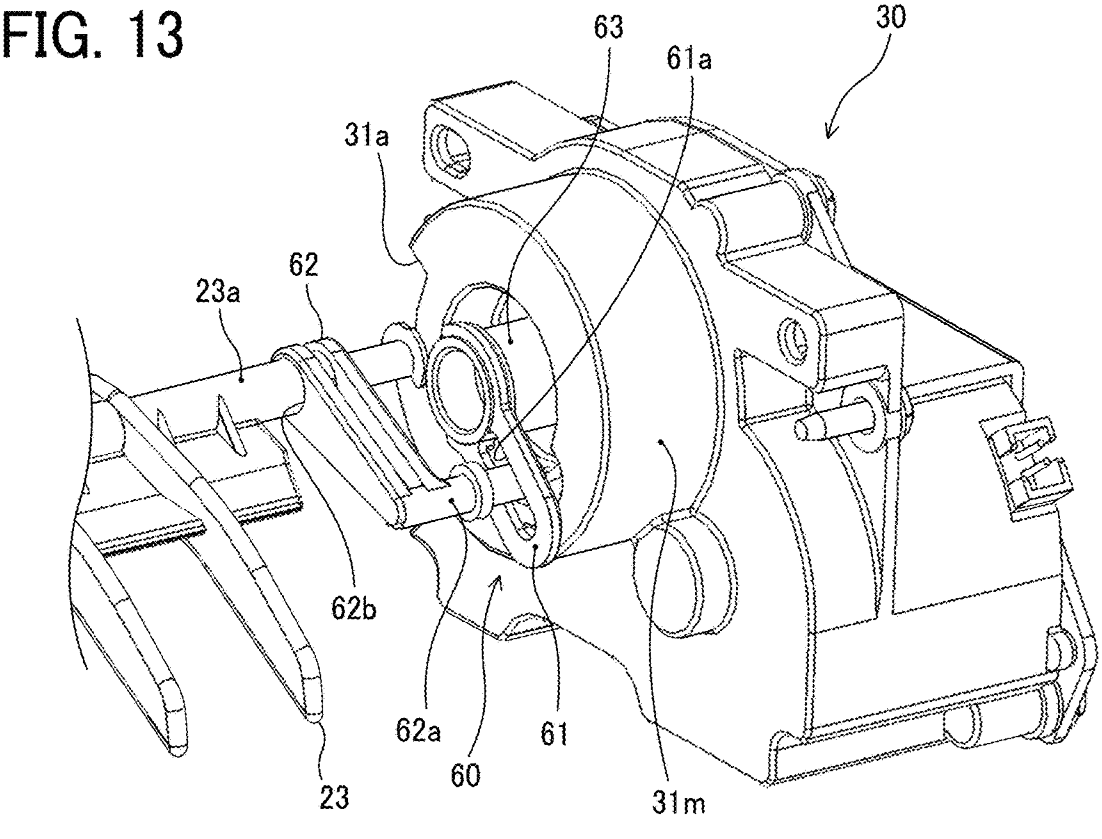
FIG. 13 is a perspective view of a swing mechanism and the drive transmission device, according to an embodiment of the present disclosure.

FIG. 13 is a perspective view of the swing mechanism 60 and the drive transmission device 30.

Figure 14A:
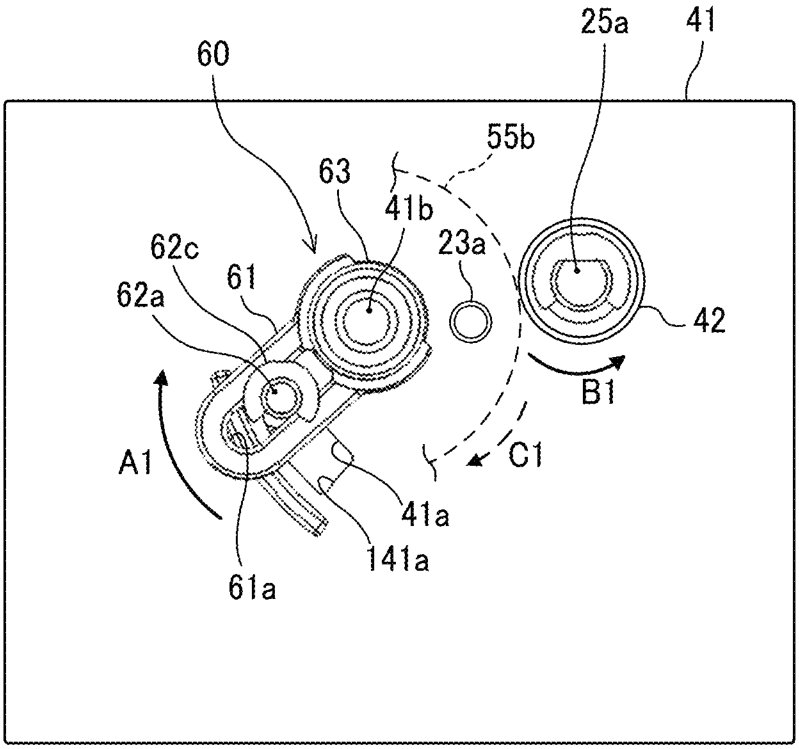
FIGS. 14A and 14B are side views of the sheet ejection unit, according to an embodiment of the present disclosure.
Figure 14B:
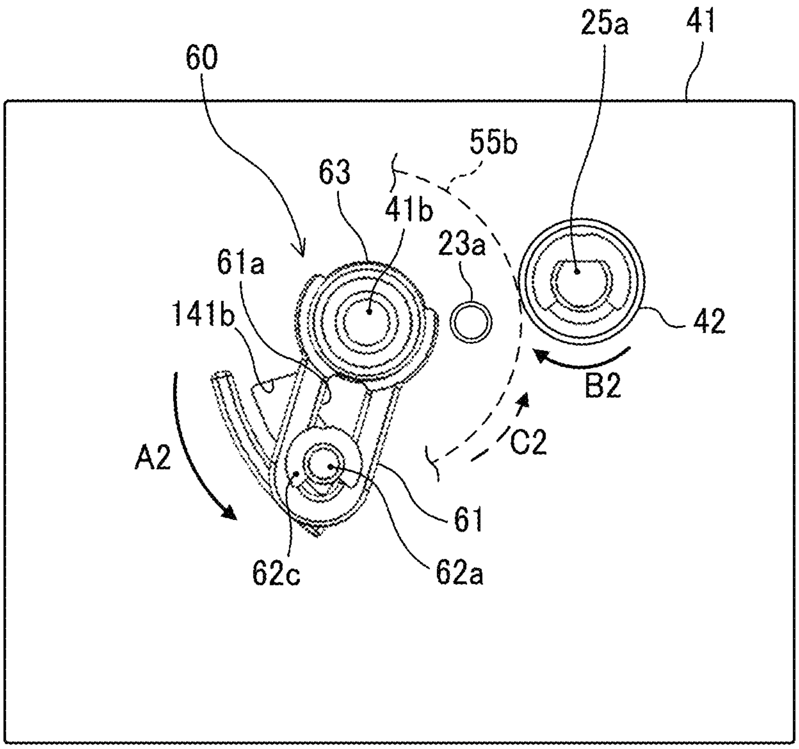

FIGS. 14A and 14B are side views of the sheet ejection unit 40.

FIG. 14A illustrates the operation to switch back the sheet for further conveyance after the sheet has passed the fixing device 17 and has been conveyed to the sheet reverse member 19.

FIG. 14B illustrated the operation to convey the sheet that has passed through the fixing device 17, to the sheet reverse member 19.

The swing mechanism 60 includes a first link member 61, the second link member 62, and the second joint 63. The second joint 63 has a cylindrical shape with both axial ends being opened. The internal gear 163 are formed on one axial end of the second joint 63 that is on the side near the drive transmission device 30. The opposite end of the second joint 63, that is on the side near the sheet ejection frame 41, is rotatably supported by the support shaft 41*b* attached to the frame side panels 141 of the sheet ejection frame 41 (see FIGS. 14A and 14B). The first link member 61 is fixed to the outer circumferential face of the second joint 63. The first link member 61 has a slot 61*a* through which the link shaft 62*a* serving as a shaft of the second link member 62 passes. The second link member 62 is provided in the sheet ejection unit 40 and is attached to the swing shaft 23*a* as illustrated in FIG. 13. The second link member 62 has an attaching portion 62*b* to be attached to the swing shaft 23*a*. The link shaft 62*a* of the second link member 62 is mounted on the opposite end to the attaching portion 62*b*. The link shaft 62*a* extends toward the drive transmission device 30. The link shaft 62*a* passes through an arc-shaped swing restriction hole 41*a* formed on the frame side panels 141 of the sheet ejection frame 41 and the slot 61*a* of the first link member 61. A retaining ring 62*c* is fitted into the distal end of the link shaft 62*a*. The link shaft 62*a* contacts both ends, which are a lower end 141*a* and an upper end 141*b* of the swing restriction hole 41*a*, so that the rotation of the switching claw 23 is restricted.

While the first link member 61 fixed to the second joint 63 rotates around the support shaft 41*b*, the second link member 62 rotates around the swing shaft 23*a*. Since the rotation centers are different from each other as described above, the link shaft 62*a* moves between the position illustrated in FIG. 14A and the position illustrated in FIG. 14B while the distance between the link shaft 62*a* and the support shaft 41*b* changes. In the present embodiment, since the slot 61*a* is the hole through which the link shaft 62*a* of the first link member 61 passes, the link shaft 62*a* can move while the distance between the link shaft 62*a* and the support shaft 41*b* changes.

When the link shaft 62*a* is at the position illustrated in FIG. 14A, the link shaft 62*a* is located close to the support shaft 41*b*. At the position in FIG. 14A, the link shaft 62*a* is located inside the internal gear container 31*m* of the housing 31 and has a sufficient clearance with the housing 31.

When the link shaft 62*a* is at the position illustrated in FIG. 14B, the link shaft 62*a* is located far from the support shaft 41*b*. At the position in FIG. 14B, the link shaft 62*a* is located facing the internal gear container 31*m* of the housing 31, and the clearance between the link shaft 62*a* and the housing 31 is reduced and relatively small.

With the above-described configuration, the distal end of the link shaft 62*a* is prone to interfere with the internal gear container 31*m* of the housing 31 due to thermal expansion of the link shaft 62*a* in the axial direction, thermal expansion of the housing 31 in the axial direction, assembly errors, and manufacturing errors, and it is unlikely that the link shaft 62*a* is moved to the position illustrated in FIG. 14B. As a result, the switching claw 23 cannot be rotated to the given position, which is prone to cause a failure such as a paper jam.

Figure 15:
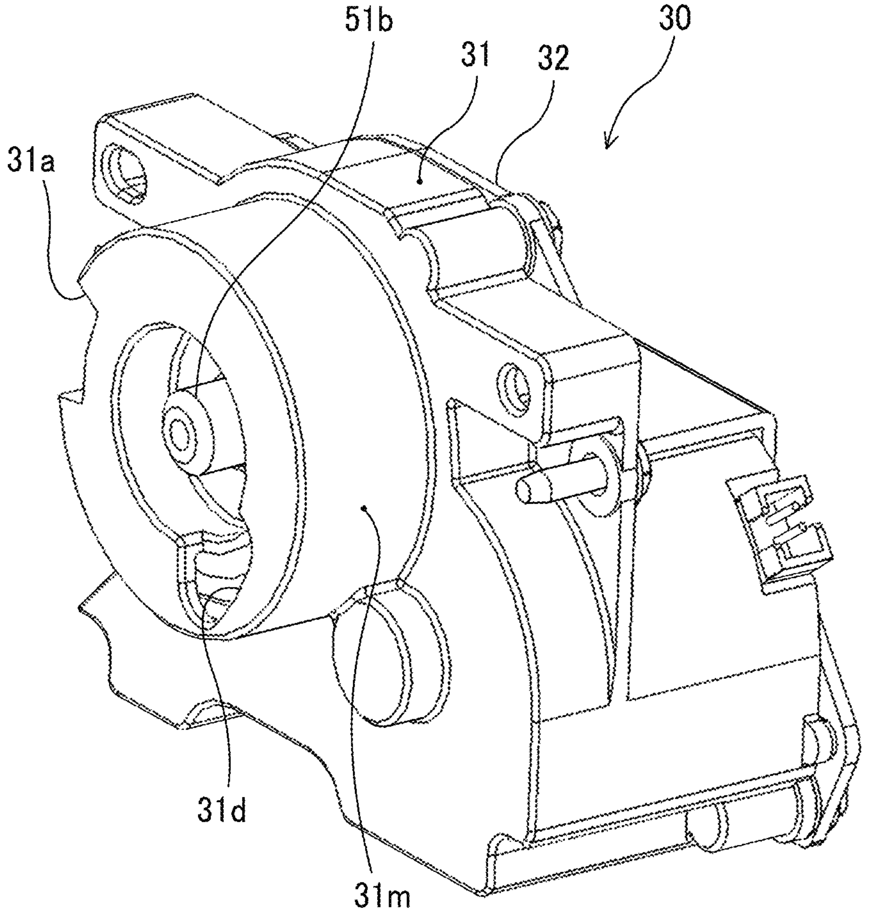
FIG. 15 is a perspective view of an escape hole formed in a housing of the drive transmission device, according to an embodiment of the present disclosure.

FIG. 15 is a perspective view of the escape hole 31*d* formed in a housing of the drive transmission device 30, according to an embodiment of the present disclosure.

To address such an inconvenience, in the present embodiment, as illustrated in FIGS. 5 and 15, the escape hole 31*d* is formed in the internal gear container 31*m* of the housing 31 so that the link shaft 62*a* serving as a shaft can escape. As a result, the link shaft 62*a* can be prevented from interfering with the housing 31 even with, for example, some thermal expansions, assembly errors, and manufacturing errors, and the link shaft 62*a* can be at the position as illustrated in FIG. 14B. As a result, the switching claw 23 can be rotated to the given position preferably, and a paper jam can be prevented.

When the switching claw 23 is at the first position as illustrated in FIG. 3A, the link shaft 62*a* is in contact with the lower end 141*a* of the swing restriction hole 41*a*, as illustrated in FIG. 14B, so that the link shaft 62*a* is restricted from rotating in the direction indicated by arrow A2 in FIG. 14B. Due to such a configuration, the switching claw 23 can stay at the first position. By contrast, when the switching claw 23 is at the second position as illustrated in FIG. 3B, the link shaft 62*a* is in contact with the upper end 141*b* of the swing restriction hole 41*a*, as illustrated in FIG. 14A, so that the link shaft 62*a* is restricted from rotating in the direction indicated by arrow A1 in FIG. 14A. Due to such a configuration, the switching claw 23 can stay at the second position.

When the sheet ejection reverse drive roller 25 is rotating in the direction indicated by the arrow in FIG. 3A, in other words, when the sheet that has passed the fixing device 17 is conveyed to the sheet reverse member 19, the sheet ejection gear 42 is rotated in the direction indicated by arrow B2 in FIG. 14B. On the other hand, when the sheet ejection reverse drive roller 25 is rotating in the direction indicated by the arrow in FIG. 3B, in other words, when the sheet that has passed the fixing device 17 is conveyed to the sheet ejection member 18 or when the sheet being conveyed by the sheet reverse member 19 is conveyed to the duplex sheet conveyance passage 21, the sheet ejection gear 42 is rotated in the direction indicated by arrow B1 in FIG. 14A.

A description is given of drive transmission of the driving force to the sheet ejection reverse drive roller 25 and the switching claw 23 of the sheet ejection unit 40, with reference to FIGS. 14A and 14B.

Table 1 described below indicates the ON and OFF states of the first electromagnetic clutch 34 and the second electromagnetic clutch 36 in the respective operations.

TABLE 1

| No. | FIRST ELECTRO-MAGNETIC CLUTCH | SECOND ELECTRO-MAGNETIC CLUTCH | OPERATIONS |
|---|---|---|---|
| 1 | OFF | OFF | STOP OF OPERATION, PAPER JAM HANDLING |
| 2 | ON | OFF | SHEET EJECTION, DUPLEX PRINTING |
| 3 | OFF | ON | SHEET REVERSAL |
| 4 | ON | ON | NONE |

As described in Table 1, when the sheet is conveyed to the sheet ejection member 18 (SHEET EJECTION in Table 1) or when the sheet being conveyed by the sheet reverse member 19 is conveyed to the duplex sheet conveyance passage 21 (DUPLEX PRINTING in Table 1), the first electromagnetic clutch 34 is in the ON state and the second electromagnetic clutch 36 is in the OFF state. On the other hand, when the sheet is conveyed to the sheet reverse member 19 (SHEET REVERSAL in Table 1), the first electromagnetic clutch 34 is in the OFF state and the second electromagnetic clutch 36 is in the ON state. When sheet conveyance is stopped or a paper jam handling is being processed, both the first electromagnetic clutch 34 and the second electromagnetic clutch 36 are in the OFF state. No operation requires the first electromagnetic clutch 34 and the second electromagnetic clutch 36 in the ON state.

First, a description is given of the drive transmission of the driving force when the sheet is conveyed to the sheet ejection member 18 (SHEET EJECTION in Table 1) or when the sheet being conveyed by the sheet reverse member 19 to the duplex sheet conveyance passage 21 (DUPLEX PRINTING in Table 1). In this drive transmission, as described in Table 1, the first electromagnetic clutch 34 is in the ON state and the second electromagnetic clutch 36 is in the OFF state. Under the above-described condition, the driving force of the fixing motor transmitted to the input gear 33 is transmitted to the first drive shaft 37 via the first electromagnetic clutch 34. The driving force is then transmitted from the gear portion 37*b* of the first drive shaft 37 to the carrier 53, so as to rotate the carrier 53.

As the carrier 53 is rotated, the planetary gear 54 supported by the carrier 53 is also rotated.

At this time, of the sun gear member 51 and the internal gear member 55, one applied with greater load torque is a fixed portion and the other applied with smaller load torque is an output portion. When the first electromagnetic clutch 34 is in the ON state and the internal gear member 55 is in the output state, the internal gear member 55 rotates in the direction indicated by arrow C1 in FIG. 14A and the sheet ejection gear 42 rotates in the direction indicated by arrow B1 in FIG. 14A. On the other hand, when the sun gear member 51 is in the output state, the link shaft 62*a* is rotated in the direction indicated by arrow A1 in FIG. 14A.

While the switching claw 23 is rotating between the first position and the second position, substantially no load is applied. On the other hand, the sheet ejection reverse drive roller 25 is applied with a given load, so that the sheet ejection driven roller 18*a* and the sheet reverse driven roller 19*a* are rotated together with the sheet ejection reverse drive roller 25. For this reason, when the link shaft 62*a* is located as illustrated in FIG. 14B, in other words, when the switching claw 23 is at the first position in FIG. 3A, the rotation in the direction indicated by arrow A1 in FIG. 14A has substantially no load. Due to such a configuration, the driving force is transmitted from the planetary gear 54 to the sun gear member 51 at this time, so that the link shaft 62*a* rotates in the direction indicated by arrow A1 in FIG. 14A. As a result, the switching claw 23 rotates from the first position illustrated in FIG. 3A to the second position illustrated in FIG. 3B. When the switching claw 23 is at the second position, the link shaft 62*a* contacts the upper end 141*b* of the swing restriction hole 41*a* as illustrated in FIG. 14A. As the link shaft 62*a* contacts the upper end 141*b* of the swing restriction hole 41*a*, the upper end 141*b* restricts the rotation of the link shaft 62*a* in the direction indicated by arrow A1. By so doing, the load torque applied to the sun gear member 51 is greater than the load torque applied to the internal gear member 55. As a result, the sun gear member 51 is the fixed portion, and the driving force is transmitted from the planetary gear 54 to the internal gear member 55. Then, the internal gear member 55 rotates in the direction indicated by arrow C1 in FIG. 14A, and the sheet ejection gear 42 rotates in the direction indicated by arrow B1 in FIG. 14A. Accordingly, the sheet ejection unit 40 enters the state indicated by FIG. 2 or FIG. 3B, so that the sheet that has passed the fixing device 17 is conveyed to the sheet ejection member 18 to be ejected to the sheet ejection tray 20. Alternatively, the sheet nipped by the sheet reverse roller pair is conveyed to the duplex sheet conveyance passage 21.

Then, a description is given of the drive transmission of the driving force when the sheet that has passed the fixing device 17 is conveyed to the sheet reverse member 19 (SHEET REVERSAL in Table 1).

As described in Table 1, when the sheet having passed through the fixing device 17 is conveyed to the sheet reverse member 19, the first electromagnetic clutch 34 is in the OFF state and the second electromagnetic clutch 36 is in the ON state. Then, the driving force of the fixing motor is transmitted from the input gear 33 to the second drive shaft 38 via the reverse gear 35 and the second electromagnetic clutch 36. The driving force is then transmitted from the gear portion 38*b* of the second drive shaft 38 to the carrier 53. The rotational direction of the carrier 53 at this time is opposite to the direction in which the driving force is transmitted from the first drive shaft 37.

For this reason, at this time, when the driving force is transmitted from the planetary gear 54 to the sun gear member 51, the link shaft 62*a* rotates in the direction indicated by arrow A2 in FIG. 14B. When the driving force is transmitted to the internal gear member 55, the link shaft 62*a* rotates in the direction indicated by arrow B2 in FIG. 14B. When the link shaft 62*a* is located as illustrated in FIG. 14A, in other words, when the switching claw 23 is at the second position in FIG. 3B, the rotation in the direction indicated by arrow A2 in FIG. 14B has substantially no load. Due to such a configuration, the driving force is transmitted from the planetary gear 54 to the sun gear member 51 at this time, so that the link shaft 62*a* rotates in the direction indicated by arrow A2 in FIG. 14B.

As a result, the switching claw 23 rotates from the second position illustrated in FIG. 3B to the first position illustrated in FIG. 3A. When the switching claw 23 is at the first position, the link shaft 62*a* contacts the lower end 141*a* of the swing restriction hole 41*a* as illustrated in FIG. 14B. As the link shaft 62*a* contacts the lower end 141*a* of the swing restriction hole 41*a*, the lower end 141*a* restricts the rotation of the link shaft 62*a* in the direction indicated by arrow A2. By so doing, the load torque applied to the sun gear member 51 is greater than the load torque applied to the internal gear member 55. As a result, the sun gear member 51 is the fixed portion, and the driving force is transmitted from the planetary gear 54 to the internal gear member 55. Then, the internal gear member 55 rotates in the direction indicated by arrow C2 in FIG. 14B, and the sheet ejection gear 42 rotates in the direction indicated by arrow B2 in FIG. 14B. Accordingly, the sheet ejection unit 40 enters the state indicated by FIG. 3A, so that the sheet that has passed the fixing device 17 is conveyed to the sheet reverse member 19.

As described above, the drive transmission device 30 includes the planetary gear mechanism 50, so as to transmit the driving force from the sun gear member 51 to the switching claw 23 and transmit the driving force from the internal gear member 55 to the sheet ejection reverse drive roller 25. By so doing, the sheet ejection reverse drive roller 25 and the switching claw 23 are separately rotated by one drive source. As a result, the above-described configuration according to the present embodiment can achieve a cost reduction in the laser printer 100, when compared with a configuration in which separate drive sources are used to the sheet ejection reverse drive roller 25 and the switching claw 23, for example, a motor rotates the sheet ejection reverse drive roller 25 and an actuator rotates the switching claw 23.

In the above description, the two driven rollers, which are the sheet ejection driven roller 18*a* and the sheet reverse driven roller 19*a*, contact the drive roller (i.e., the sheet ejection reverse drive roller 25) to which the driving force is transmitted from the internal gear member 55. However, a single driven roller may contact the driven roller. Even in such a configuration, the load torque of the drive roller can be made greater than the load torque applied when rotating the switching claw 23, and the destination of drive transmission can be changed.

A description is now given the positioning of the switching claw 23 in the thrust direction.

Figure 16:
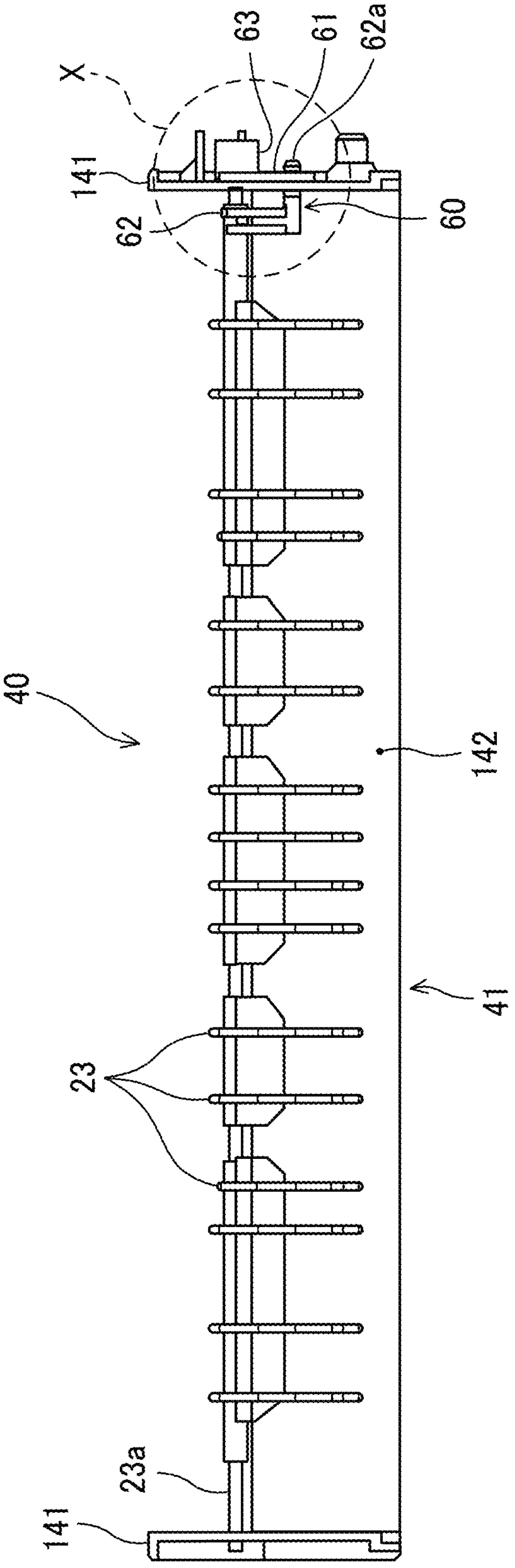
FIG. 16 is a schematic front view of the sheet ejection unit, according to an embodiment of the present disclosure.

FIG. 16 is a schematic front view of the sheet ejection unit 40.

Figure 17:
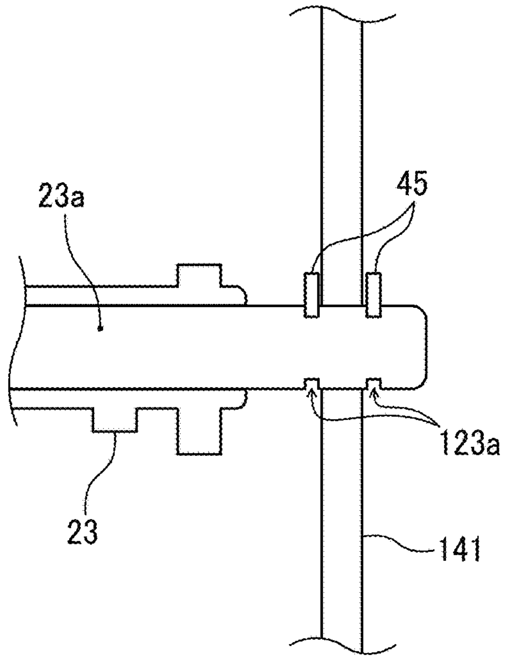
FIG. 17 is an enlarged cross-sectional view of an area X of FIG. 16.

FIG. 17 is an enlarged cross-sectional view of an area X of FIG. 16.

Both ends of the swing shaft 23*a* of the switching claw 23 are rotatably supported by the frame side panels 141 of the sheet ejection frame 41. As illustrated in FIG. 17, two grooves 123*a* are provided at the right end of the swing shaft 23*a*, at an interval substantially equal to the thickness of the sheet ejection frame 41. Respective retaining rings 45 are fitted into the grooves 123*a* and the sheet ejection frame 41 is held by the retaining rings 45, so as to position the swing shaft 23*a* in the thrust direction. As described above, one end of the swing shaft 23*a* is positioned in the thrust direction while the positioning in the thrust direction is not performed on the opposite end of the swing shaft 23*a*.

When the positioning in the thrust direction is performed by providing grooves at both ends of the swing shaft 23*a*, providing the retaining rings 45 at the respective grooves, and causing the retaining rings 45 to face the frame side panels 141 of the sheet ejection frame 41 from the outside, the following inconveniences may occur. Specifically, when the distance between the frame side panels 141 is increased due to thermal expansion of the sheet ejection frame 41, the frame side panels 141 contact the retaining rings 45. Due to this contact, the swing shaft 23*a* is prevented from rotating, thereby increasing the torque at the rotation of the switching claw 23. As a result, the load torque applied to the sun gear member 51 when the switching claw 23 is rotated becomes greater than the load torque applied to the internal gear member 55, which is likely to prevent the switching claw 23 from rotating.

By contrast, in the present embodiment, the swing shaft 23*a* in the thrust direction is positioned on one axial side of the swing shaft 23*a*. By so doing, even when the distance between the frame side panels 141 is increased due to the thermal expansion of the sheet ejection frame 41, the frame side panels 141 do not strongly contact the retaining rings 45. This positioning can preferably rotate the switching claw 23. Further, it is preferable to position the swing shaft 23*a* of the switching claw 23 in the thrust direction on the side of the side panel on which the drive transmission device 30 is disposed. This positioning can let heat of the frame side panels 141 to escape to, for example, the drive transmission device 30, so that the rise in temperature of the frame side panels 141 can be prevented, and the thermal expansion of the frame side panels 141 can also be prevented. Accordingly, the frame side panel 141 on which the drive transmission device 30 is disposed is prevented from strongly contacting the retaining rings 45 provided with the frame side panel 141 in between due to thermal expansion of the frame side panel 141.

Figure 18:
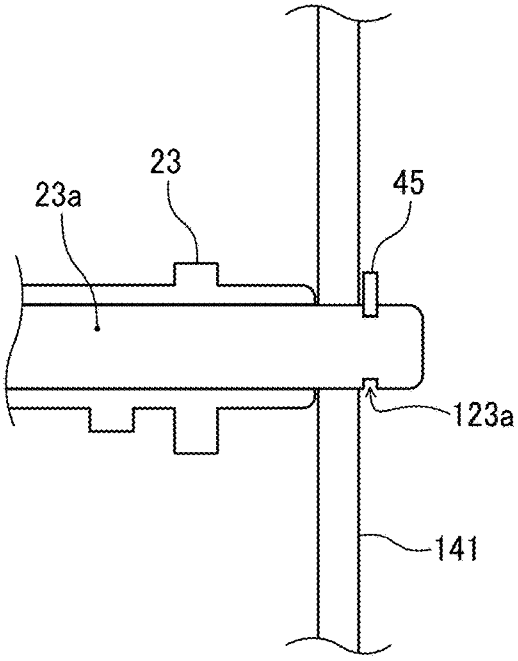
FIG. 18 is a diagram illustrating the positioning of a swing shaft in the thrust direction, according to a modification of the present embodiment.

In addition, FIG. 18 is a diagram illustrating the positioning of the swing shaft 23*a* in the thrust direction.

As illustrated in FIG. 18, the switching claw 23 may be placed near the frame side panel 141, so that the swing shaft 23*a* of the switching claw 23 in the thrust direction may be positioned by the switching claw 23 and the single retaining ring 45 disposed outside the frame side panel 141. According to this configuration, the number of retaining rings 45 can be reduced. As a result, the manpower for assembly and the number of parts can be reduced, and the cost reduction of the laser printer 100 can be achieved.

A description is now given of assembly of the drive transmission device 30 and the sheet ejection unit 40 to the housing of the laser printer 100.

Figure 19:
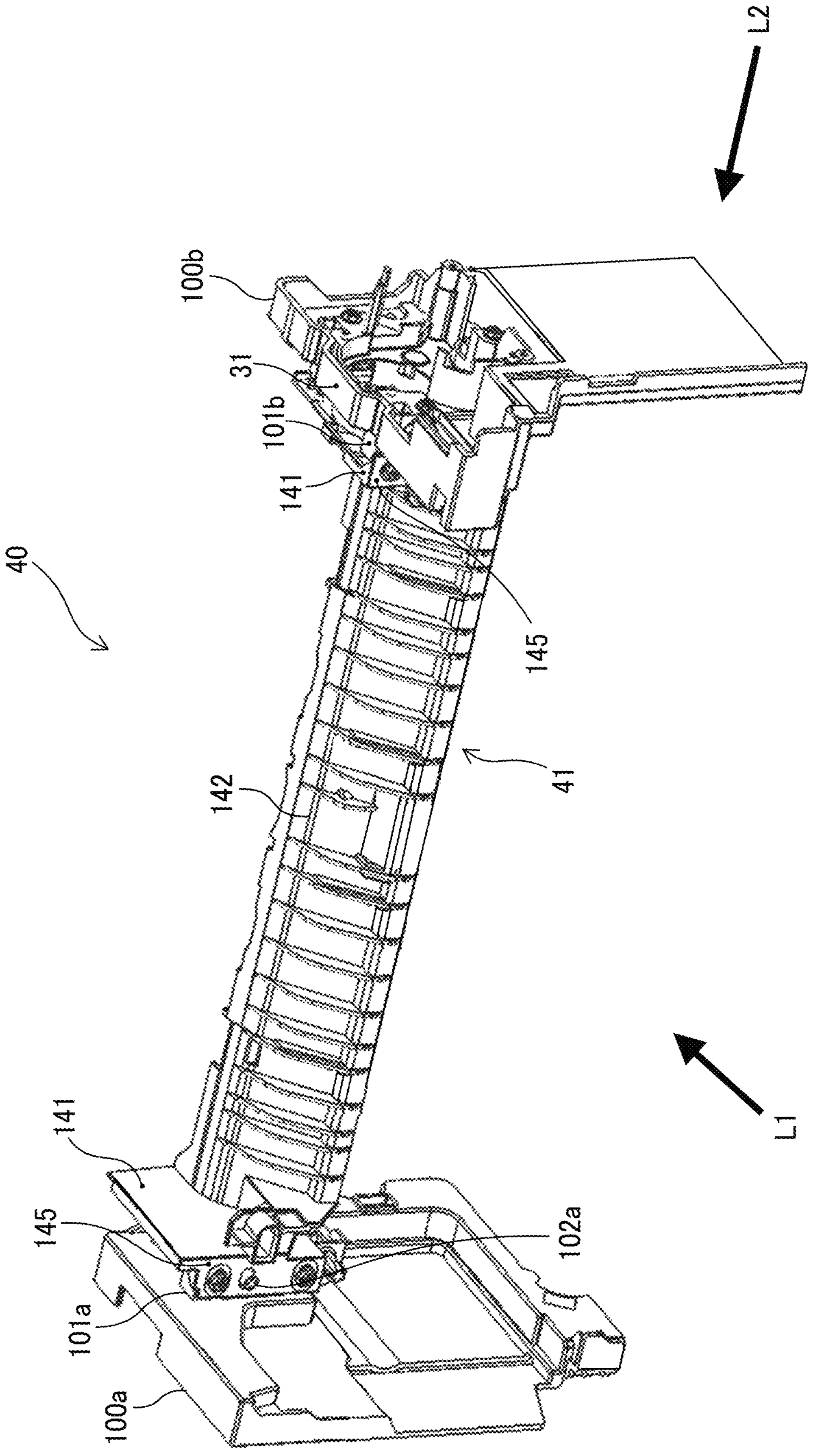
FIG. 19 is a perspective view of a sheet ejection frame, the housing of the drive transmission device, and a front side panel and a rear side panel of the image forming apparatus, according to an embodiment of the present disclosure.

FIG. 19 is a perspective view of the sheet ejection frame 41, the housing 31, an apparatus front side panel 100*a*, and the apparatus rear side panel 100*b*.

Figure 20:
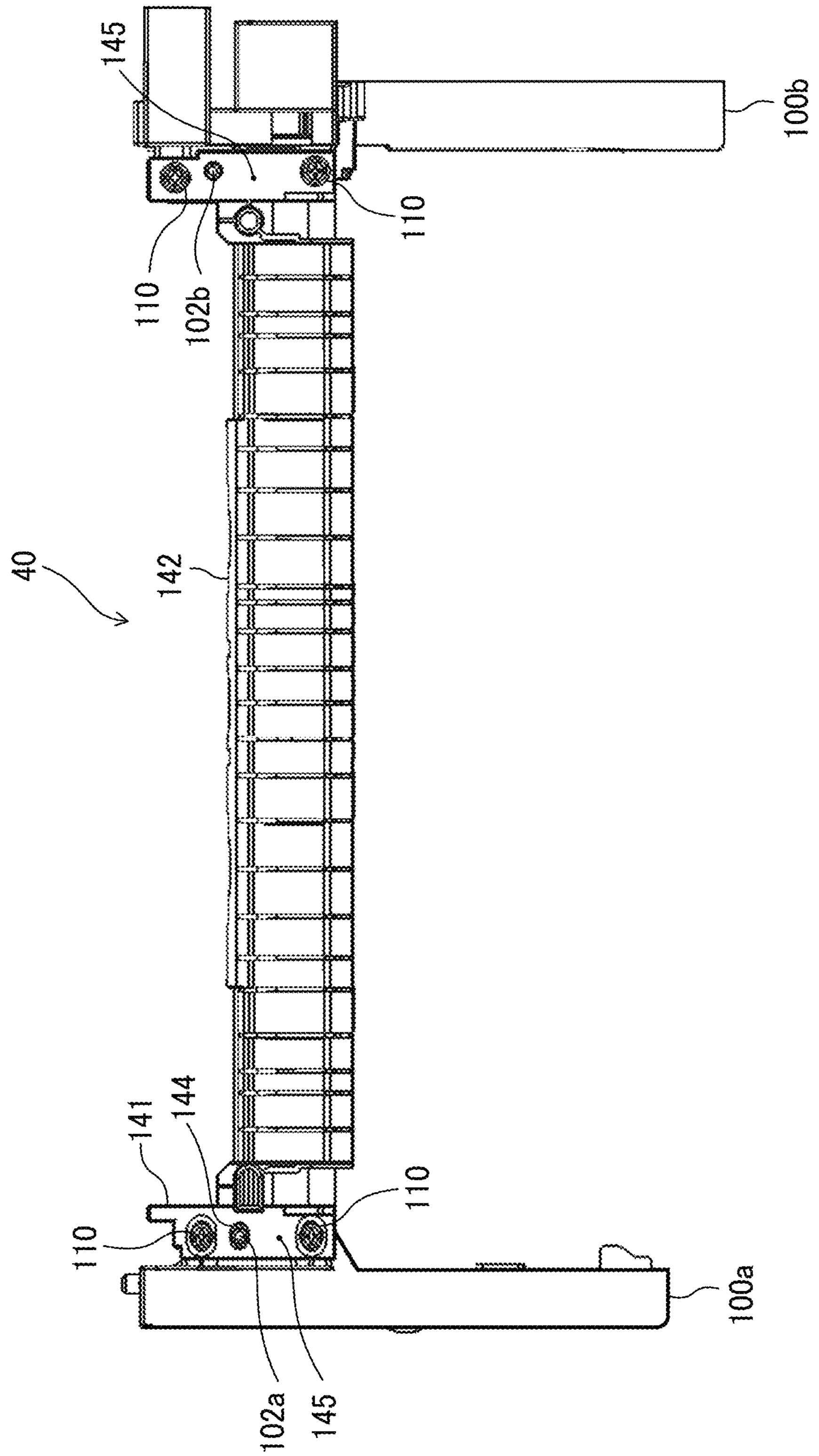
FIG. 20 is a diagram illustrating the sheet ejection frame and the front side panel and the rear side panel of the image forming apparatus, viewed from arrow L1 of FIG. 19, according to an embodiment of the present disclosure.

FIG. 20 is a diagram illustrating the sheet ejection frame 41, the apparatus front side panel 100*a*, and the apparatus rear side panel 100*b*, viewed from arrow L1 of FIG. 19.

Figure 21:
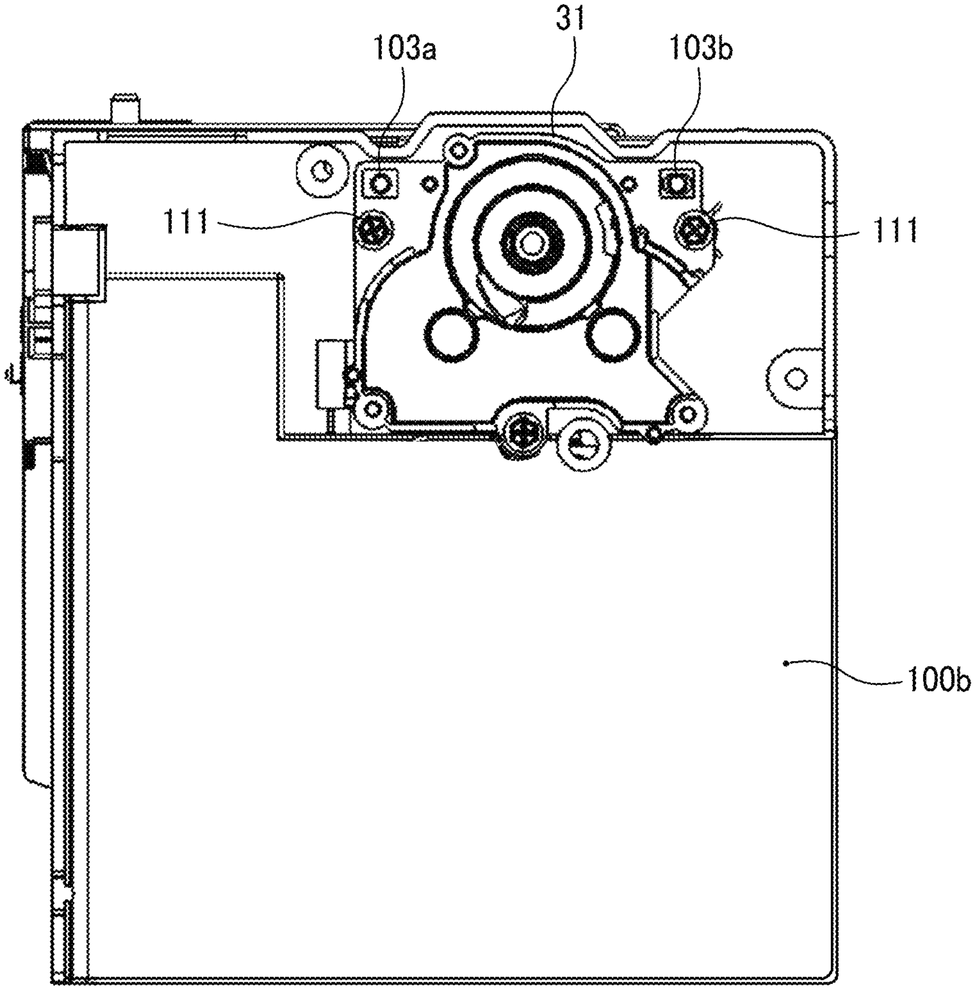
FIG. 21 is a diagram illustrating the rear side panel of the image forming apparatus, viewed from arrow L2 of FIG. 19, according to an embodiment of the present disclosure.

FIG. 21 is a diagram illustrating the apparatus rear side panel 100*b*, viewed from arrow L2 of FIG. 19.

In FIGS. 19, 20, and 21, only the housing 31 of the drive transmission device 30 is illustrated to clarify the fixing of the drive transmission device 30 to the apparatus rear side panel 100*b*. However, the housing 31 is attached as an integrated unit to the apparatus rear side panel 100*b* as illustrated in FIGS. 4A and 4B.

The apparatus front side panel 100*a* and the apparatus rear side panel 100*b* serve as positioning members of the laser printer 100, to which the sheet ejection frame 41 is positioned. The apparatus front side panel 100*a* and the apparatus rear side panel 100*b* have sheet ejection unit fixing portions 101*a* and 101*b*, respectively. The sheet ejection unit fixing portions 101*a* and 101*b* protrude toward the sheet ejection unit 40, in other words, toward the inside the laser printer 100. These sheet ejection unit fixing portions 101*a* and 101*b* have respective screw holes at two positions with a given interval in the vertical direction, so that two screws are inserted into the screw holes. Each of positioning projections 102*a* and 102*b* for positioning the sheet ejection unit 40 is provided at a position between the two screw holes.

As illustrated in FIG. 20, the positioning hole 144 that is formed in the fixing portion 145 of the sheet ejection frame 41 on the apparatus front side panel 100*a* (left in FIG. 20) is a slot serving as a secondary reference for the positioning. On the other hand, the positioning hole 144 that is formed in the fixing portion 145 of the sheet ejection frame 41 on the apparatus rear side panel 100*b* (right in FIG. 20) is a round hole serving as a primary reference for the positioning.

After the positioning projection 102*a* of the apparatus front side panel 100*a* and the positioning projection 102*b* of the apparatus rear side panel 100*b* are inserted into the respective positioning holes 144 in the fixing portions 145 of the frame side panels 141 of the sheet ejection frame 41 and the sheet ejection frame 41 is positioned, the sheet ejection frame 41 is screwed by the screws 110. By so doing, the sheet ejection unit 40 is positioned and fixed to the laser printer 100.

As illustrated in FIG. 21, the apparatus rear side panel 100*b* has a positioning projection 103*a* that passes through the primary reference positioning hole 31*g* (see FIG. 4B) formed in the housing 31, and a positioning projection 103*b* that passes through the secondary reference positioning hole 31*h* (see FIG. 4B) formed in the housing 31. In addition, the apparatus rear side panel 100*b* has a through hole through which the internal gear container 31*m* (see FIG. 4B) of the housing 31 passes.

When the integrated drive transmission device 30 is assembled to the laser printer 100, the internal gear container 31*m* of the housing 31 is brought to pass through the through hole formed in the apparatus rear side panel 100*b*. Further, the positioning projections 103*a* and 103*b* provided on the apparatus rear side panel 100*b* are inserted into the primary reference positioning hole 31*g* and the secondary reference positioning hole 31*h* of the housing 31, respectively, to position the housing 31 to the apparatus rear side panel 100*b*. Then, as illustrated in FIG. 21, the housing 31 is fastened to the apparatus rear side panel 100*b* by screws 111. By so doing, the drive transmission device 30 integrated as a single unit is positioned and fixed to the housing of the laser printer 100.

In the present embodiment, the drive transmission device 30 is positioned and fixed to the apparatus rear side panel 100*b* serving as a positioning member to which the sheet ejection unit 40 is positioned. Due to such a configuration, when compared with a configuration in which the drive transmission device 30 is positioned and fixed to a member different from the member to which the sheet ejection unit 40 is positioned, a positional deviation between the sheet ejection unit 40 and the drive transmission device 30 can be prevented. As a result, the external gear portion 55*b* (see FIG. 5) of the internal gear member 55 can be preferably meshed with the sheet ejection gear 42 (see FIG. 5). In addition, the first joint 51*b* can be smoothly inserted into the second joint 63.

In the above description, two electromagnetic clutches (e.g., the first electromagnetic clutch 34 and the second electromagnetic clutch 36) perform the ON-OFF control on the link shaft 62*a*, the sheet ejection gear 42, and the internal gear member 55 to rotate in the rotational directions indicated by arrows A1. B1, and C1, respectively, illustrated in FIG. 14A and the link shaft 62*a*, the sheet ejection gear 42, and the internal gear member 55 to switch the rotations in the rotational directions indicated by arrows A2, B2, and C2, respectively, illustrated in FIG. 14B. However, the rotational directions of the link shaft 62*a*, the sheet ejection gear 42, and the internal gear member 55 may be switched by the forward and reverse rotations of a motor. In this case, a motor for the forward and reverse rotations dedicated to the sheet ejection unit is used. However, a motor gear of the motor may be meshed with the external gear portion 53*b* of the carrier 53, and two electromagnetic clutches and two drive shafts can be removed. Further, in this case, the motor for the forward and reverse rotations dedicated to the sheet ejection unit is contained in the housing 31 to integrate the motor for the forward and reverse rotations and the drive train as a single unit. This integration of the motor for the forward and reverse rotations and the drive train can preferably enhance the assemblability to the housing of the laser printer 100.

Further, in the planetary gear mechanism 50 according to the present embodiment, the carrier 53 serves as an input portion and the sun gear member 51 and the internal gear member 55 serve as output portions. However, the functions of these parts in the planetary gear mechanism 50 are not limited to this configuration. For example, the sun gear member 51 may be the input portion and the carrier 53 and the internal gear member 55 may be the output portions. Alternatively, the internal gear member 55 may be the input portion and the sun gear member 51 and the carrier 53 may be the output portions. In the present embodiment, a joint is used for drive coupling with the swing mechanism 60 that rotates the switching claw 23. However, a joint may be used for the drive coupling with the sheet ejection reverse drive roller 25. In addition, a joint may be used for both the drive coupling of the swing mechanism 60 that rotates the switching claw 23 and the drive coupling of the sheet ejection reverse drive roller 25.

Figure 22:
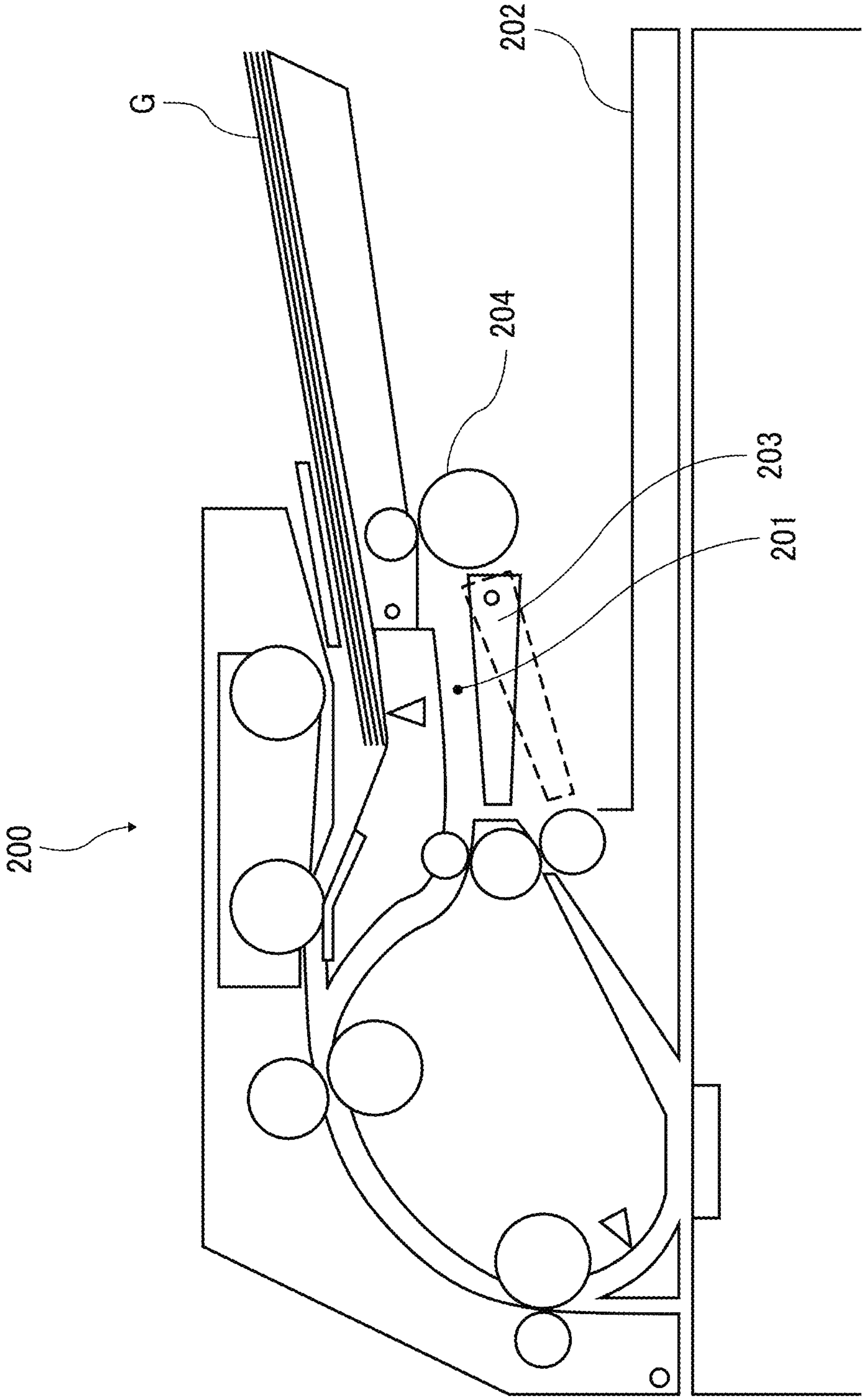
FIG. 22 is a schematic view of an automatic document feeder, according to an embodiment of the present disclosure.

FIG. 22 is a schematic view of an automatic document feeder, according to an embodiment of the present disclosure.

The drive transmission device 30 according to the above-described present embodiment may be applied to, for example, an automatic document feeder (ADF) 200 illustrated in FIG. 22. For example, the drive transmission device 30 according to the present embodiment can be used for the drive transmission of a switching claw 203 and a document reverse drive roller 204. The switching claw 203 serving as a swing member to switch whether an original document G having a read image illustrated in FIG. 22 is conveyed to the document ejection tray 202 or to a document reverse area 201. The document reverse drive roller 204 in the document reverse area 201 is rotated in the forward direction or the reverse direction.

Figure 23:
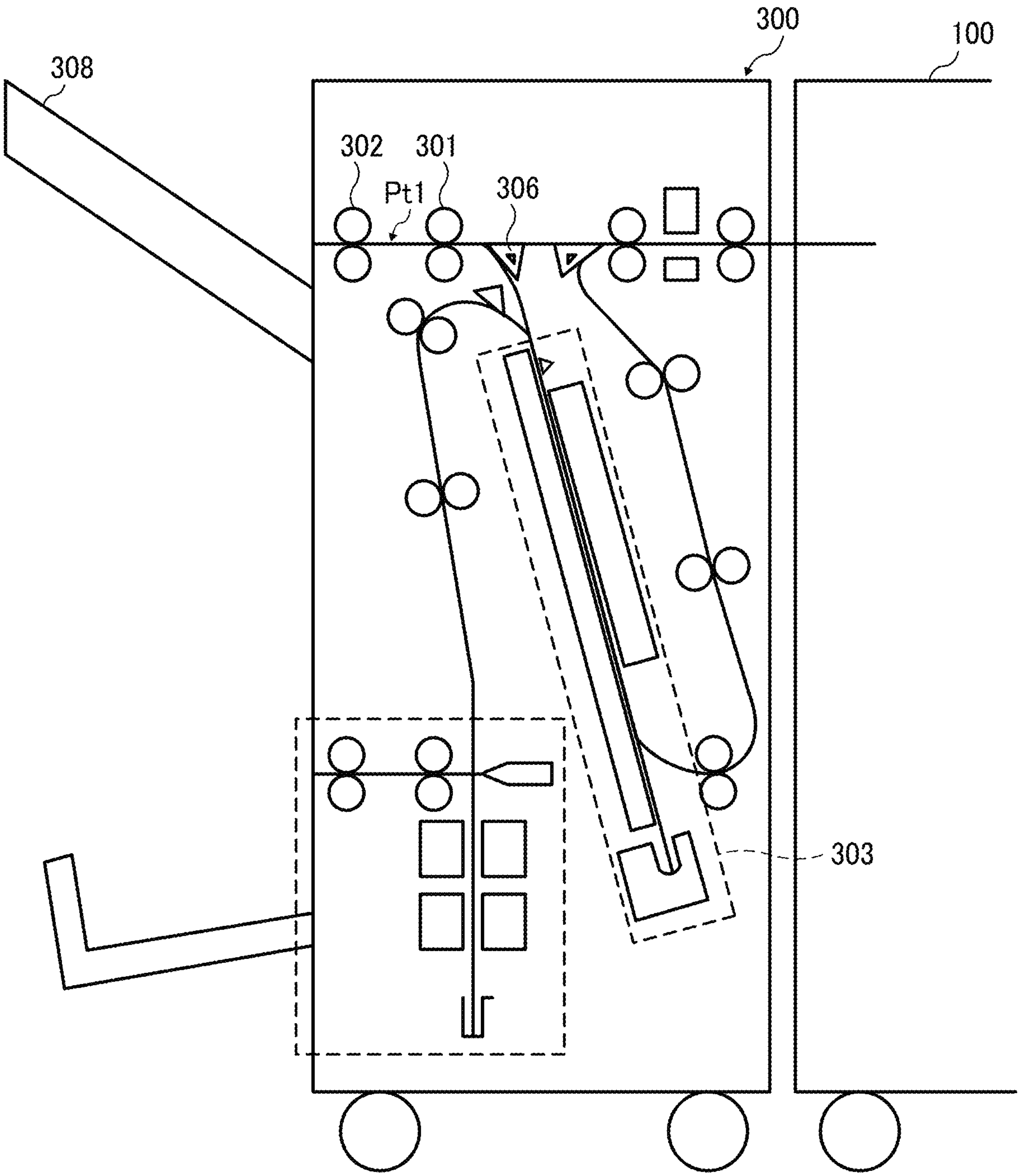
FIG. 23 is a schematic view of a post-processing apparatus, according to an embodiment of the present disclosure.

FIG. 23 is a schematic view of a post-processing apparatus, according to an embodiment of the present disclosure.

The drive transmission device 30 according to the present embodiment may be applied to a post-processing apparatus 300 illustrated in FIG. 23. For example, the drive transmission device 30 according to the present embodiment may be used for drive transmission of a switching claw 306 and each of a conveyance roller 301 and a sheet ejection roller 302, both rotating in the forward and reverse directions. The switching claw 306 performs switchback conveyance on the sheet that is conveyed toward a sheet ejection tray 308 through a sheet conveyance passage Ptl to a binding unit 303.

Further, the swing member to which the drive transmission device 30 transmits the driving force is not limited to the switching claw and may be a swing panel that moves the bottom plate of the sheet tray vertically.

Although specific embodiments are described, the embodiments according to the present disclosure are not limited to those specifically described herein. Several aspects of the drive transmission device, the drive unit, and the image forming apparatus are exemplified as follows.

Aspect 1

In Aspect 1, a drive transmission device (for example, the drive transmission device 30) includes a drive train including a plurality of drive transmitters (for example, the first drive shaft 37, the second drive shaft 38, the input gear 33, the reverse gear 35, the planetary gear mechanism 50, the first electromagnetic clutch 34, the second electromagnetic clutch 36), and a container (for example, the housing 31) that contains the drive train. The plurality of drive transmitters transmit a driving force of a drive source to a rotator (for example, the sheet ejection reverse drive roller 25) rotatable around a shaft (for example, the rotary shaft 25*a*) and a swing member (for example, the switching claw 23) rotatable around a shaft (for example, the swing shaft 23*a*) different from the shaft of the rotator.

According to this configuration, by assembling the container to the housing of an image forming apparatus (for example, the laser printer 100), the drive transmission device can be assembled to the housing of the image forming apparatus. Due to such a configuration, when compared with the configuration in which the multiple drive transmitters included in the drive train are separately assembled to the housing of the image forming apparatus, the drive transmission device of Aspect 1 can enhance the assemblability to the housing of the image forming apparatus.

Aspect 2

In Aspect 1, the drive train includes a coupler (for example, the first joint 51*b*) having drive transmitting portions (for example, the external gear 151). The coupler is coupled to a coupled member (for example, the second joint 63) of the swing member (for example, the switching claw 23) or the rotator (for example, the sheet ejection reverse drive roller 25), and the coupled member has a driven member (for example, the internal gear 163). One of the coupler and the coupled member is inserted into another one of the coupler and the coupled member when the coupler and the coupled member are coupled to each other. At least one of an axial end of the drive transmitting portions of the coupler or an axial end of the driven member of the coupled member has an inclined face (for example, the inclined faces 163*a*, 151*a*) inclined toward a direction in which the coupler or the coupled member rotates.

According to this configuration, as described with reference to FIG. 12, at the time of drive coupling, even if the axial end of the drive transmitting portions (for example, the external gear 151) of the coupler (for example, the first joint 51*b*) contacts the axial end of the driven member (for example, the internal gear 163) of the coupled member (for example, the second joint 63) from the axial direction, the drive transmitting portions are guided by the inclined face and can enter between the driven member. As a result, the coupler can be drivingly coupled to the coupled member easily.

Aspect 3

In Aspect 1 or 2, the container (for example, the housing 31) is positioned to a positioning member (for example, the apparatus front side panel 100*a*, the apparatus rear side panel 100*b*) to which a support frame (for example, the sheet ejection frame 41) supporting the swing member (for example, the switching claw 23) and the rotator (for example, the sheet ejection reverse drive roller 25) is positioned.

According to this configuration, as described with reference to FIG. 22, the positional deviation between the swing member (for example, the switching claw 23), the rotator (for example, the sheet ejection reverse drive roller 25), and the drive transmission device can be prevented. Accordingly, the driving force can be transmitted from the drive transmission device (for example, the drive transmission device 30) to the swing member and the rotator preferably.

Aspect 4

In any one of Aspects 1 to 3, the drive train includes a planetary gear mechanism (for example, the planetary gear mechanism 50).

According to this configuration, as described in the embodiments above, the planetary gear mechanism includes a plurality of drive transmitters. For this reason, the operability of assembly is effectively enhanced by containing these drive transmitters in the container. In addition, by using the planetary gear mechanism, one of the carrier, the internal gear member, and the sun member of the planetary gear mechanism is used for output to the swing member, and one of the remaining two is used for output to the rotator. By so doing, after the swing member has rotated between the first position and the second position, the rotator can rotate. As a result, one drive source can rotate both the swing member and the rotator. When compared with the configuration in which the swing member and the rotator are rotated by separate drive sources, the above-described configuration according to the present embodiment can achieve a cost reduction in the image forming apparatus (for example, the laser printer 100).

Aspect 5

In Aspect 4, the planetary gear mechanism (for example, the planetary gear mechanism 50) includes a sun gear (for example, the sun gear 51*a*), and a coupler (for example, the first joint 51*b*) to be coupled to a coupled member (for example, the second joint 63) of the swing member (for example, the switching claw 23) or the rotator (for example, the sheet ejection reverse drive roller 25). The sun gear and the coupler are on a same axis.

According to this configuration, an increase in size in the radial direction of the apparatus can be prevent, when compared with a configuration in which the sun gear member and the coupler are located on the axes different from each other.

Aspect 6

In any one of Aspects 1 to 5, the drive transmission device further includes a support (for example, the cover 32) fixed to the container to rotatably support at least one of the plurality of drive transmitters (for example, the sun gear member 51, the first drive shaft 37, and the second drive shaft 38 in the present embodiment) of the drive train contained in the container (for example, the housing 31). The support has four corners positioned to the container.

According to this configuration, as described in the embodiments above, the support (for example, the cover 32) can be fastened to the container (for example, the housing 31) while preventing deformation of the support at the positioning portions at four corners.

Accordingly, deformation of the support is prevented, and inclination of the drive transmission device rotatably supported by the support can be prevented.

Aspect 7

In any one of Aspects 1 to 6, the container (for example, the housing 31) swings with the swing member and has an escape hole (for example, the escape hole 31*d*) to allow a shaft (link shaft 62*a*) facing the container to escape.

According to this configuration, as described in the embodiments above, the shaft can be prevented from interfering with the container (for example, the housing 31) even with, for example, some thermal expansions, assembly errors, and manufacturing errors, and the swing member can be rotated preferably.

Aspect 8

In Aspect 8, a drive unit (for example, the sheet ejection unit 40) includes a swing member (for example, the switching claw 23) rotatable around a shaft (for example, the swing shaft 23*a*), a rotator (for example, the sheet ejection reverse drive roller 25) rotatable around a shaft (rotary shaft 25*a*), and the drive transmission device (for example, the drive transmission device 30) according to any one of Aspects 1 to 7. The drive transmission device transmits a driving force of a drive source to the swing member and the rotator.

According to this configuration, the drive transmission device can be assembled easily.

Aspect 9

In Aspect 8, the drive unit (for example, the sheet ejection unit 40) further includes a support frame (for example, the sheet ejection frame 41) including a pair of supports (for example, the frame side panels 141) that support the swing member (for example, the switching claw 23) and the rotator (for example, the sheet ejection reverse drive roller 25) at both sides of the shaft. The swing member is positioned in a thrust direction of the swing member to one of the pair of supports.

According to this configuration, as described with reference to FIG. 17, the swing member can rotate smoothly even if the support frame (for example, the sheet ejection frame 41) thermally expanded in the thrust direction.

Aspect 10

In Aspect 8 or 9, the rotator is a conveyance roller (for example, the sheet ejection reverse drive roller 25) that conveys a sheet. The swing member is a switching member (for example, the switching claw 23) that switches a conveyance passage of the sheet.

According to this configuration, the rotation of the conveyance roller and the switching of destination of the switching member can be performed by a single drive source.

Aspect 11

In Aspect 11, an image forming apparatus (for example, the laser printer 100) includes the drive transmission device (for example, the drive transmission device 30) according to any one of Aspects 1 to 7 or the drive unit (for example, the sheet ejection unit 40) according to any one of Aspects 8 to 10.

According to this configuration, the operability of assembly of the device can be enhanced.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

What is claimed is:

1. A drive transmission device comprising:

a drive train including a plurality of drive transmitters configured to transmit a driving force of a drive source to a rotator rotatable around a shaft and a swing member rotatable around a shaft different from the shaft of the rotator; and a container that contains the drive train, wherein:

the rotator is a roller, the swing member is a switching claw, the drive transmitters include two outputs to drive the roller and the switching claw, respectively, a rotation of the roller has a higher resistive force on the drive train then a rotation of the switching claw, when the switching claw is not restricted from moving, the drive source rotates the switching claw, when the switching claw is restricted from moving, the drive source rotates the roller.

2. The drive transmission device according to claim 1, wherein the drive train includes a coupler having drive transmitting portions, wherein the coupler is configured to be coupled to a coupled member of the swing member or the rotator, the coupled member having a driven member, wherein one of the coupler and the coupled member is inserted into another one of the coupler and the coupled member when the coupler and the coupled member are coupled to each other, and wherein at least one of an axial end of the drive transmitting portions of the coupler or an axial end of the driven member of the coupled member has an inclined face inclined toward a direction in which the coupler or the coupled member rotates.

3. The drive transmission device according to claim 1, wherein the container is positioned to a positioning member to which a support frame supporting the swing member and the rotator is positioned.

4. The drive transmission device according to claim 1, wherein the drive train includes a planetary gear mechanism.

5. The drive transmission device according to claim 4, wherein the planetary gear mechanism includes a sun gear; and a coupler configured to be coupled to a coupled member of the swing member or the rotator, and wherein the sun gear and the coupler are on a same axis.

6. The drive transmission device according to claim 1, further comprising:

a support fixed to the container to rotatably support at least one of the plurality of drive transmitters of the drive train contained in the container, wherein the support has four corners positioned to the container.

7. The drive transmission device according to claim 1, wherein the container is configured to swing with the swing member and has an escape hole to allow at least one of the shafts which faces the container to escape.

8. The drive transmission device according to claim 1, further comprising:

a support frame including a pair of supports that support the swing member and the rotator at both ends of the shaft of the swing member, wherein the swing member is positioned in a thrust direction of the swing member to one of the pair of supports.

9. An image forming apparatus comprising the drive unit according to claim 1.

10. An image forming apparatus comprising the drive transmission device according to claim 1.

11. The drive transmission device according to claim 1, wherein:

the switching claw is restricted from moving when the swing member contacts a fixed element.

12. The drive transmission device according to claim 1, further comprising:

a planetary gear mechanism which includes a carrier, planetary gears, a ring gear, and a sun gear, the carrier receives the driving force of the drive source, the sun gear drives movement of the switching claw, and the ring gear drives movement of the roller.

* * * * *